US00RE51052E

(19) United States
(12) Reissued Patent
Toki et al.

(10) Patent Number: US RE51,052 E
(45) Date of Reissued Patent: Oct. 6, 2026

(54) PRINTING APPARATUS

(71) Applicant: CANON KABUSHIKI KAISHA, Tokyo (JP)

(72) Inventors: Nobuhiro Toki, Kawasaki (JP); Hideaki Matsumura, Kawasaki (JP)

(73) Assignee: CANON KABUSHIKI KAISHA, Tokyo (JP)

(21) Appl. No.: 17/988,582

(22) Filed: Nov. 16, 2022

Related U.S. Patent Documents

Reissue of:
(64) Patent No.: 11,135,852
Issued: Oct. 5, 2021
Appl. No.: 16/816,962
Filed: Mar. 12, 2020

(30) Foreign Application Priority Data

Apr. 5, 2019 (JP) ..... 2019-073078

(51) Int. Cl.
*B41J 2/175* (2006.01)
*B41J 2/165* (2006.01)
*B41J 2/51* (2006.01)
*B41J 29/13* (2006.01)

(52) U.S. Cl.
CPC ..... *B41J 2/17596* (2013.01); *B41J 2/17523* (2013.01); *B41J 29/13* (2013.01); *B41J 2002/16594* (2013.01); *B41J 2/51* (2013.01)

(58) Field of Classification Search
None
See application file for complete search history.

(56) References Cited

U.S. PATENT DOCUMENTS 6,239,822 B1 5/2001 Zapata et al. ..... B41J 2/175
6,247,784 B1 * 6/2001 Obana ..... B41J 2/17543 347/7
6,450,610 B1 * 9/2002 Shimura ..... B41J 29/13 347/108

(Continued)

FOREIGN PATENT DOCUMENTS

CN 1215662 5/1999
CN 1473708 2/2004

(Continued)

OTHER PUBLICATIONS

G1000 series, G2000 series, G3000 series Service Manual, Canon, Inc., all pages. (Year: 2017).*

(Continued)

*Primary Examiner* — Jacob C. Coppola
(74) *Attorney, Agent, or Firm* — Venable LLP

(57) ABSTRACT

There is provided with a printing apparatus. An ink tank stores ink to be supplied to a printhead configured to eject ink. An ink supply path supplies ink from the ink tank to the printhead. A conveying unit conveys a print medium to the printhead. A cover member is arranged so as to be able to open and close with respect to the printing apparatus. A manual valve is arranged in a region through which the print medium conveyed by the conveying unit passes and can be switched between an opening state in which the ink tank and the printhead communicate and a closing state. An operating portion is arranged at a position which is exposed when the cover member is opened and can be operated to switch the manual valve.

59 Claims, 14 Drawing Sheets

(56) References Cited

U.S. PATENT DOCUMENTS

| | | | | |
|---|---|---|---|---|
| 6,991,313 | B2 | 1/2006 | Sasa | B41J 2/165 |
| 7,637,602 | B2 * | 12/2009 | Silverbrook | B41J 29/08 347/85 |
| 8,403,459 | B2 | 3/2013 | Seino et al. | B41J 2/01 |
| 8,485,620 | B2 | 7/2013 | Kitabatake et al. | B41J 29/38 |
| 9,085,163 | B2 | 7/2015 | Sunouchi et al. | B41J 2/165 |
| 9,102,162 | B2 | 8/2015 | Watanabe et al. | B41J 2/19 |
| 9,561,658 | B2 | 2/2017 | Danzuka et al. | B41J 29/393 |
| 9,738,081 | B2 | 8/2017 | Kimura et al. | B41J 2/17513 |
| 9,738,087 | B2 | 8/2017 | Kato et al. | B41J 2/195 |
| 9,840,084 | B2 * | 12/2017 | Nakamura | B41J 2/17523 |
| 10,118,396 | B2 | 11/2018 | Kimura et al. | B41J 2/17596 |
| 10,538,096 | B2 | 1/2020 | Abe et al. | B41J 2/165 |
| 10,569,560 | B2 | 2/2020 | Wada et al. | B41J 2/165 |
| 11,059,308 | B2 * | 7/2021 | Ido | B41J 25/34 |
| 11,110,715 | B2 | 9/2021 | Tojo | B41J 2/17523 |
| 2003/0007047 | A1 | 1/2003 | Otsuka et al. | 347/89 |
| 2004/0041853 | A1 * | 3/2004 | Takahashi | B41J 3/4071 347/5 |
| 2005/0041075 | A1 | 2/2005 | Fujioka | B41J 2/175 |
| 2005/0168545 | A1 * | 8/2005 | Sakai | 347/86 |
| 2006/0071952 | A1 * | 4/2006 | Motominami | B41J 3/46 347/5 |
| 2006/0170831 | A1 * | 8/2006 | Muraki | B41J 3/46 349/1 |
| 2006/0209140 | A1 | 9/2006 | Nagai | B41J 2/175 |
| 2007/0202745 | A1 * | 8/2007 | Morimoto | 439/607.01 |
| 2008/0105310 | A1 * | 5/2008 | Ogami | 137/557 |
| 2008/0231671 | A1 | 9/2008 | Lee et al. | B41J 2/175 |
| 2010/0026753 | A1 * | 2/2010 | Kuroda | B41J 2/16532 347/23 |
| 2011/0063383 | A1 * | 3/2011 | Tsukuda | B41J 2/17509 347/86 |
| 2012/0026254 | A1 | 2/2012 | Tamaki | B41J 2/175 |
| 2012/0050416 | A1 * | 3/2012 | Ishizawa | B41J 2/175 347/85 |
| 2012/0050420 | A1 * | 3/2012 | Sekino | B41J 2/17509 347/85 |
| 2012/0306975 | A1 * | 12/2012 | Ohnishi | B41J 2/175 347/94 |
| 2012/0320216 | A1 * | 12/2012 | Mkrtchyan | A63F 13/655 348/E5.09 |
| 2013/0063521 | A1 | 3/2013 | Muraki | 347/36 |
| 2013/0197899 | A1 * | 8/2013 | Roulland | G06Q 10/20 704/9 |
| 2014/0009553 | A1 * | 1/2014 | Kawakami | B41J 29/02 347/108 |
| 2014/0063088 | A1 * | 3/2014 | Shibata | B41J 2/175 347/6 |
| 2014/0085386 | A1 * | 3/2014 | Wei | B41J 2/17596 347/85 |
| 2014/0085391 | A1 * | 3/2014 | Wei | B41J 29/38 347/108 |
| 2014/0292955 | A1 * | 10/2014 | Kimura | B41J 2/17523 347/85 |
| 2016/0339727 | A1 * | 11/2016 | Danzuka | B41J 2/17566 |
| 2017/0120609 | A1 * | 5/2017 | Kimura | B41J 2/17553 |
| 2017/0120617 | A1 | 5/2017 | Matsumura et al. | B41J 2/17596 |
| 2017/0305163 | A1 * | 10/2017 | Kimura | B41J 29/13 |
| 2018/0311964 | A1 * | 11/2018 | Tanaka | B41J 2/17536 |
| 2018/0311967 | A1 | 11/2018 | Matsumura | B41J 2/1707 |
| 2019/0039383 | A1 * | 2/2019 | Matsumura | B41J 2/17596 |
| 2020/0062000 | A1 * | 2/2020 | Tojo | B41J 29/13 |
| 2020/0269596 | A1 * | 8/2020 | Ochiai | B41J 2/17509 |

FOREIGN PATENT DOCUMENTS

| | | | | |
|---|---|---|---|---|
| CN | 101310987 | | 11/2008 | |
| CN | 101850661 | | 10/2010 | |
| CN | 101925465 | | 12/2010 | |
| CN | 102381025 | | 3/2012 | |
| CN | 102815091 | | 12/2012 | |
| CN | 103057273 | | 4/2013 | |
| CN | 103302991 | | 9/2013 | |
| CN | 103522755 | | 1/2014 | |
| CN | 104417081 | | 3/2015 | |
| CN | 204431981 | U | 7/2015 | |
| CN | 106183411 | | 12/2016 | |
| CN | 106626786 | | 5/2017 | |
| CN | 108688319 | | 10/2018 | |
| CN | 108790402 | | 11/2018 | |
| CN | 109203711 | | 1/2019 | |
| EP | 3162573 | A1 * | 5/2017 | B41J 2/01 |
| JP | 2004-130574 | | 4/2004 | |
| JP | 2004-330470 | | 11/2004 | |
| JP | 2004-330471 | | 11/2004 | |
| JP | 2006-239934 | | 9/2006 | |
| JP | 2013-056499 | | 3/2013 | |
| JP | 2013-056504 | | 3/2013 | |
| JP | 2014-188929 | | 10/2014 | |
| JP | 2017-081120 | | 5/2017 | |
| JP | 2017-081125 | | 5/2017 | |
| JP | 2018-187787 | | 11/2018 | |
| JP | 2020032533 | A * | 3/2020 | B41J 2/01 |
| JP | 2020131650 | A * | 8/2020 | B41J 2/01 |
| JP | 2023-089061 | | 6/2023 | |

OTHER PUBLICATIONS

Canon, "G2000 series Online Manual," downloaded from https://web.archive.org/web/20171013011315/https://gdlp01.c-wss.com/gds/0/0300021460/02/G2000ser_OnlineManual_Win_EN_V02.pdf, p. 138. (Year: 2017).*

Office Action dated Mar. 31, 2023 in counterpart Chinese Application No. 202210824422.5, together with English translation thereof.

Office Action dated Mar. 31, 2023 in counterpart Chinese Application No. 202210826031.7, together with English translation thereof.

Office Action dated Dec. 1, 2021 in counterpart Chinese Application No. 202010237092.0, together with English translation thereof.

Office Action dated Nov. 21, 2022 in counterpart Japanese Application No. 2019-073078, together with English translation thereof.

Office Action dated Feb. 17, 2025 in counterpart Japanese Application No. 2024-022200, together with English translation thereof.

Office Action dated Nov. 18, 2024 in counterpart Japanese Application No. 2024-022200, together with English translation thereof.

U.S. Appl. No. 16/728,460, filed Dec. 27, 2019.

* cited by examiner

FIG. 12
(Amended)
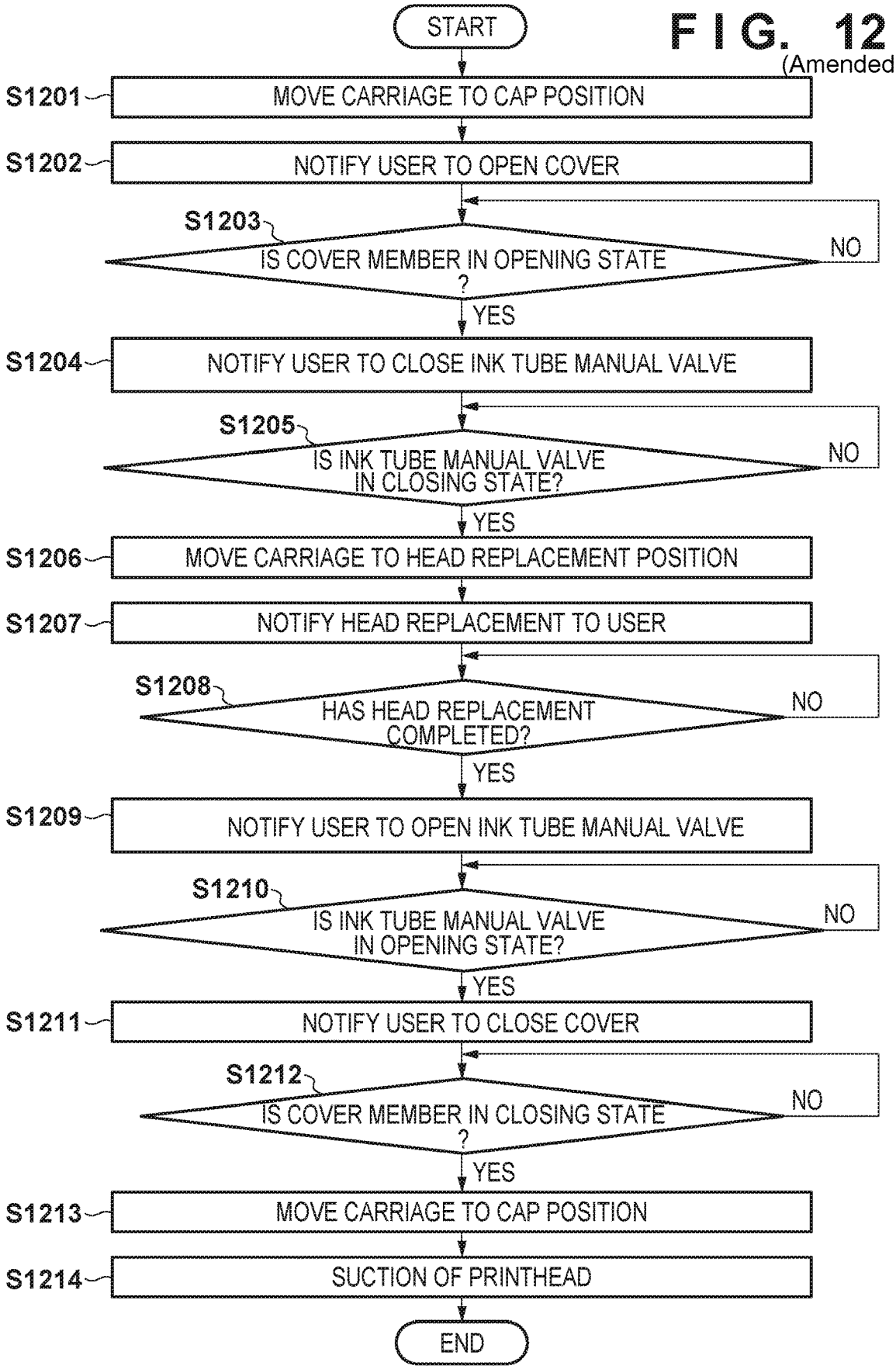

FIG. 13
(Amended)
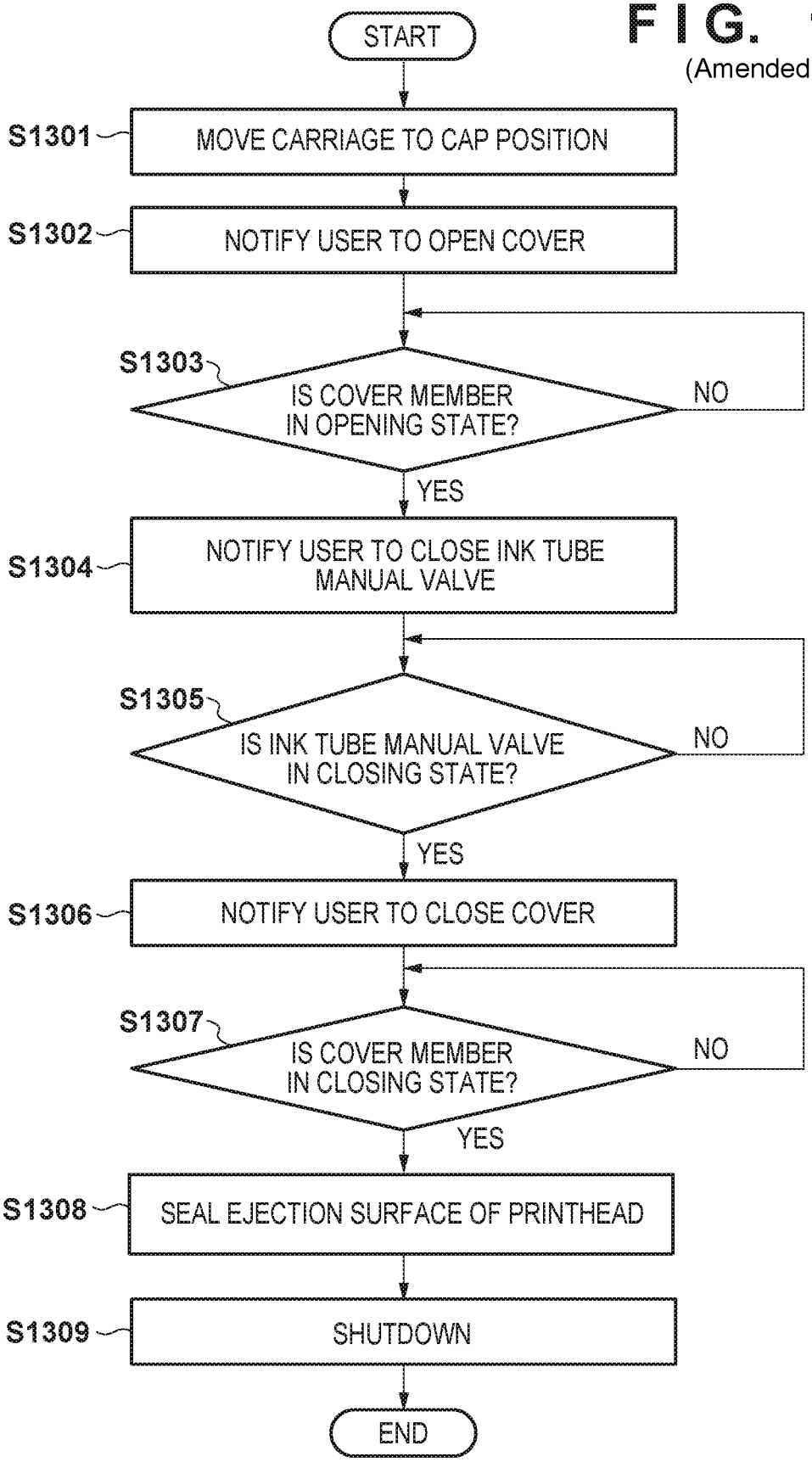

PRINTING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is for reissue of U.S. Pat. No. 11,135,852 issued Oct. 5, 2021, which was filed as U.S. patent application Ser. No. 16/816,962 on Mar. 12, 2020; and claims priority under 35 U.S.C. § 119 to Japan Application No. 2019-073078 filed in Japan on Apr. 5, 2019; and the contents of all of which are incorporated herein by reference as if set forth in full.*

BACKGROUND OF THE INVENTION

Field of the Invention

The present invention relates to a printing apparatus.

Description of the Related Art

Conventionally, there is known an inkjet printing apparatus in which a printhead that ejects ink and an ink tank that stores the ink to be supplied to the printhead are connected by a tube. Japanese Patent Laid-Open No. 2014-188929 discloses a printing apparatus in which a valve that can close the tube between the printhead and the ink tank is arranged on the front surface of the printing apparatus.

SUMMARY OF THE INVENTION

According to one embodiment of the present invention, a printing apparatus comprises: an ink tank configured to store ink to be supplied to a printhead configured to eject ink; an ink supply path configured to supply ink from the ink tank to the printhead; a conveying unit configured to convey a print medium to the printhead; a cover member arranged so as to be able to open and close with respect to the printing apparatus; a manual valve that is arranged in a region through which the print medium conveyed by the conveying unit passes and can be switched between an opening state in which the ink tank and the printhead communicate and a closing state in which the ink tank and the printhead do not communicate; and an operating portion that is arranged at a position which is exposed when the cover member is opened and can be operated to switch the manual valve.

According to another embodiment of the present invention, a printing apparatus comprises: a carriage configured to detachably carry a printhead configured to eject ink; an ink tank configured to store ink to be supplied to the printhead; an ink supply path configured to supply ink from the ink tank to the printhead; a manual valve that is arranged on the ink supply path and can be switched between an opening state in which the ink tank and the printhead communicate and a closing state in which the ink tank and the printhead do not communicate; and an operating portion that switches the manual valve by movement of the carriage.

Further features of the present invention will become apparent from the following description of exemplary embodiments (with reference to the attached drawings).

BRIEF DESCRIPTION OF THE DRAWINGS

FIG. 12 is a flowchart showing an example of processing performed by the CPU when the printhead is replaced according to an embodiment;

FIG. 13 is a flowchart showing an example of processing performed by the CPU at the time of a transportation setting mode according to an embodiment;

DESCRIPTION OF THE EMBODIMENTS

Figure 1A:
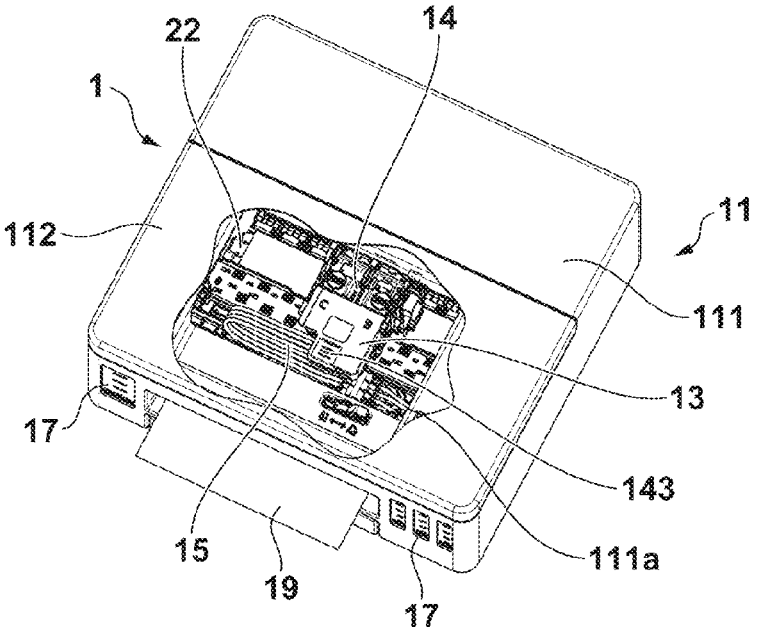
FIG. 1A is a perspective view showing a printing apparatus according to an embodiment by cutting a part of a cover member.

In the conventional technique described above, the valve is arranged at a position where the valve can be operated easily even during the printing operation of the printing apparatus. Hence, if the valve is closed by an erroneous operation by the user or the like while the printing operation is performed in the printing apparatus, the ink supplying operation to the printhead may malfunction.

In consideration of the above problem, an embodiment of the present invention provides a technique to suppress an erroneous operation of a valve by a user.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In this specification, the term "printing" not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

In addition, the term "print medium" not only includes a paper sheet used in common printing apparatuses, but also broadly includes conveyable media, such as cloth, a plastic film, a metal plate, glass, ceramics, wood, leather, and the like.

Furthermore, the term "ink" (to also be referred to as a "liquid" hereinafter) should be extensively interpreted in a similar manner to the definition of "printing (print)" described above, and includes a liquid which, when applied onto a print medium, can form images, figures, patterns, and the like, can process the print medium, or can process ink (for example, solidify or insolubilize a coloring material contained in ink applied to the print medium).

First Embodiment

<Schematic Arrangement of Printing Apparatus>

FIG. 1A is a perspective view showing an inkjet printing apparatus 1 (to be referred to as a printing apparatus 1 hereinafter) according to the first embodiment. The view shows a state in which a part of cover member 112 (to be described later) has been cut out to describe the internal arrangement. The printing apparatus 1 includes a printhead 14 that ejects ink to a print medium and ink tanks 17 that store inks to be supplied. The printing apparatus 1 also includes supply tubes 15, each of which forms an ink supply path 155 (see FIG. 3) for supplying ink from a corresponding the ink tank 17 to the printhead 14. The printing apparatus 1 also includes a carriage 13 that moves reciprocally while carrying the detachable printhead 14.

The printing apparatus 1 includes a plurality of rollers (conveying units) that convey a sheet-like print medium 19, and these rollers convey the print medium 19 in a conveyance direction perpendicular to a movement direction (main scanning direction) of the carriage 13 (the printhead 14). Also, a platen 22 is arranged so as to face the printhead 14 below a range in which the printhead 14 will move.

A rotatably supported detachment/attachment operation portion 143 is arranged in the carriage 13. A user can operate the detachment/attachment operation portion 143 to detach or attach the printhead 14 from or to the carriage 13. In addition, a housing 11 has been arranged so as to entirely cover these components. The housing 11 includes a main body 111 which has an opening portion 111a and a cover member 112 which covers the opening portion 111a. The cover member 112 is supported so as to be able to open/close the main body 111 (apparatus).

Figure 1B:
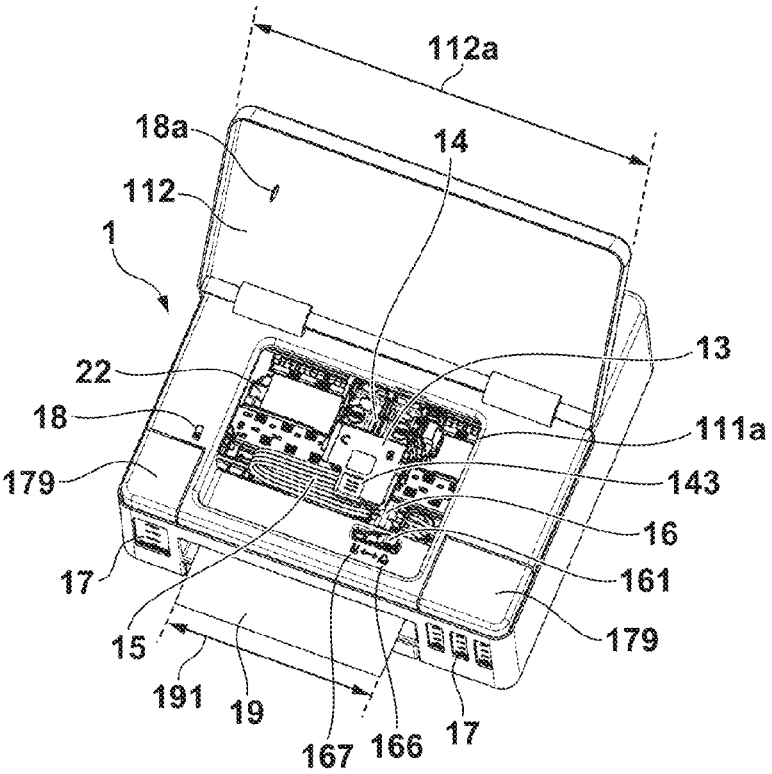
FIG. 1B is a perspective view of the printing apparatus whose cover member is in an opening state according to an embodiment.

The arrangement of the cover member 112 and the arrangement of a manual valve 16 according to the first embodiment will be described next with reference to FIG. 1B. FIG. 1B is perspective view showing the printing apparatus 1 in which the cover member 112 is in an opening state. A state in which the cover member 112 is open is a state in which the carriage 13, the printhead 14, the platen 22, the supply tubes 15, and the manual valve 16 are exposed.

In this embodiment, the manual valve 16 is a valve for closing/communicating the ink supply paths 155 formed by the supply tubes 15, and includes an operating portion 161 which can be operated manually by the user. That is, the manual valve 16 is arranged on the ink supply paths 155 and is capable of switching between an opening state which allows the ink tanks 17 and the printhead 14 to communicate and a closing state which does not allow the ink tanks and the printhead to communicate. The operating portion 161 can be operated to switch the state of the manual valve 16. In addition, a print mark 166 and a maintenance mark 167 are shown to indicate the operation positions of the operating portion 161. If the operating portion 161 is on the side indicated by the print mark 166, the ink supply paths 155 are not closed by the manual valve 16, and ink from each ink tank 17 can be supplied to the printhead 14. Hence, the printing apparatus 1 will be able to print on the print medium 19. On the other hand, if the operating portion 161 is on the side indicated by the maintenance mark 167, the ink supply path 155 are closed by the manual valve 16, and ink will not be supplied from each ink tank 17 to the printhead 14. Hence, the user can perform an operation to replace the printhead 14 in a state in which the movement of inks in the ink supply paths 155 has been suppressed. The user can also intuitively recognize the state of the manual valve 16 by the print mark 166 and the maintenance mark 167.

A print medium width 191 indicates the width of the maximum size print medium 19 that can be printed by the printing apparatus 1 according to this embodiment. In this case, a widthwise direction is a direction perpendicular to the conveyance direction of the print medium 19 by the conveying unit. In this embodiment, a width 112a of the cover member 112 is larger than the print medium width 191 in the widthwise direction. The manual valve 16 is arranged in a region covered by the cover member 112 and is within a region passed by the print medium 19 when the print medium is conveyed. In other words, the manual valve 16 is arranged within the printing range of the printhead 14 in the widthwise direction. This can reduce the size of the printing apparatus 1 in the widthwise direction.

Furthermore, the printing apparatus 1 includes a cover sensor 18 that can detect the state of the cover member 112. For example, the cover sensor 18 can detect the opening state and the closing state of the cover member 112. More specifically, a protrusion 18a is arranged on the inner side of the cover member 112. If the protrusion 18a is abutting against the cover sensor 18, it will be detected that the cover member 112 is in the closing state. Otherwise, it will be detected that the cover member 112 is in the opening state. In addition, an ink tank cover 179, which can rotatably open/close, is arranged so as to cover an ink injection port 176 and an ink tank cap 177 (see FIG. 3) on each ink tanks 17.

Figure 2:
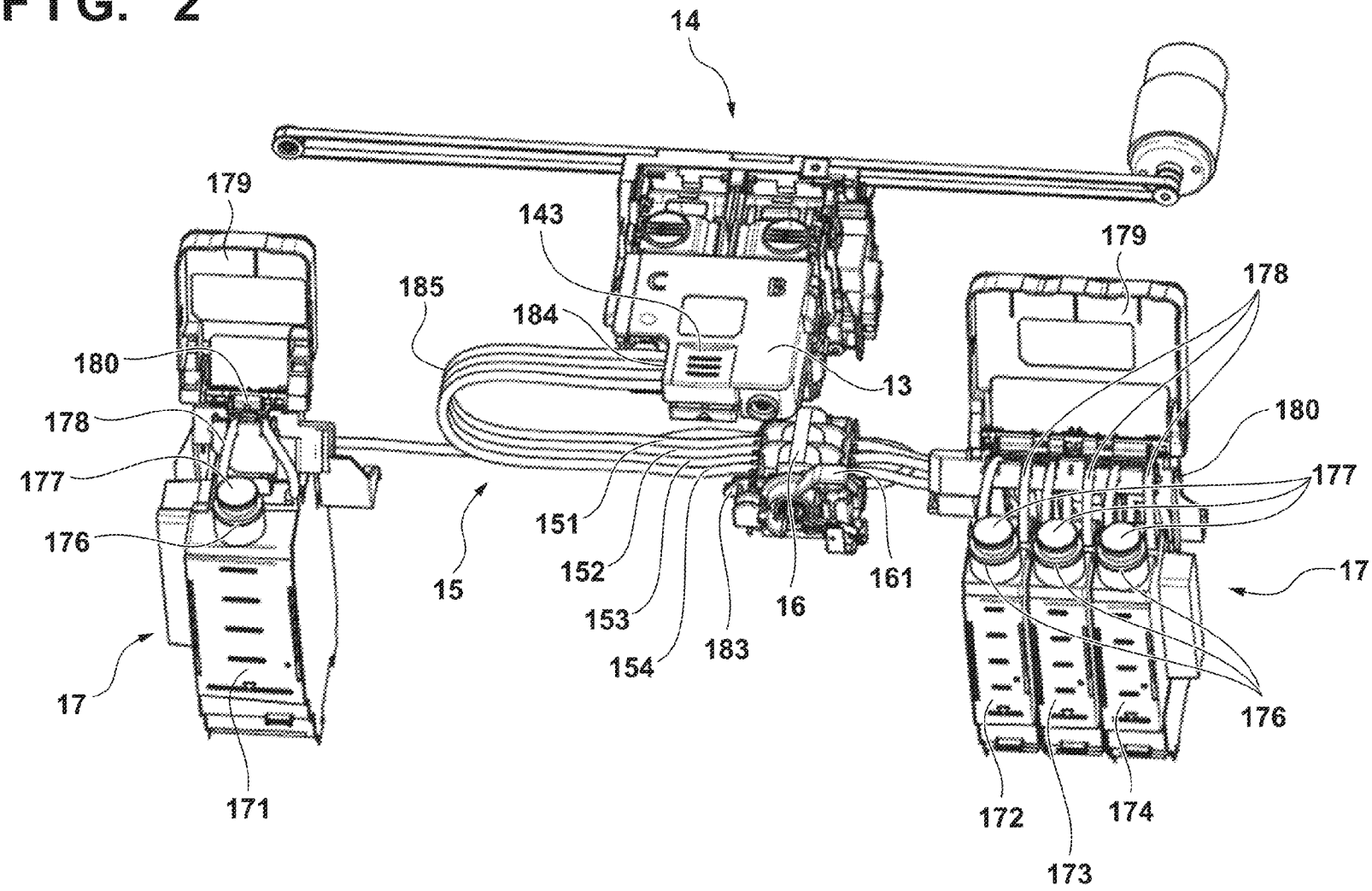
FIG. 2 is a schematic view of ink tanks, a printhead, and supply tubes that connect the ink tanks to the printhead according to an embodiment.

The arrangement of the ink tanks 17 and the supply tubes 15 will be described next with reference to FIG. 2. FIG. 2 is a schematic view of the ink tanks 17 (ink storage units), the printhead 14, and the supply tubes 15 which connect these components. The printing apparatus 1 includes the plurality of ink tanks 17 in correspondence with the ink colors. In this embodiment, the printing apparatus is provided with four ink tanks 17, that is, a black ink tank 171, a cyan ink tank 172, a magenta ink tank 173, and a yellow ink tank 174. In this embodiment, the black ink tank 171 is arranged on one side of the widthwise direction of the printing apparatus 1, and the cyan ink tank 172, the magenta ink tank 173, and the yellow ink tank 174 are arranged side by side on the other side. That is, as shown in FIG. 1, it is arranged so that the print medium 19 that has been printed will pass between the black ink tank 171 and the color ink tanks.

Note that the ink tank 17 is a generic name for the ink tank of each ink color. Assume that the arrangement of the ink tank 17 to be described below is included in the ink tank of each ink color. It is likewise for the arrangement of the supply tube 15 and each of supply tubes 151 to 154 of the respective ink colors.

The supply tube 15 for supplying ink to the printhead 14 is attached to each ink tank 17. In this embodiment, each supply tube 15 is a supply path formation member that forms the ink supply path 155 for supplying ink from the corresponding ink tank 17 to the printhead 14. In this embodiment, the tube that forms the supply tube 15 is made of a flexible material such as an elastomer or the like, and the tube can bend or be squashed in accordance with the movement of the printhead 14 to block the ink supply path 155 inside the supply tube.

An atmosphere communication tube 178 that communicates the inside of the ink tank to the atmosphere is attached to each ink tank 17. The ink injection port 176 (injection portion) for injecting ink is arranged on the upper portion of each ink tank 17. The ink tank cap 177 for sealing the ink injection port 176 is arranged on each ink injection port 176. The user can remove the ink tank cap 177 to inject ink from the ink injection port 176 to each ink tank 17.

An ink tank valve 180 that blocks the communication of ink or air is arranged in each of the supply tubes 15 and the atmosphere communication tubes 178. In this embodiment, the ink tank valves 180 are arranged on both the side of the black ink tank and the side of the color ink tanks.

When the ink tank valves 180 on the side of the black ink tank are closed, the communication of the ink supply path 155 of the supply tube 15 connected to the black ink tank 171 and the communication of the channel inside the atmosphere communication tube 178 are closed. When the ink tank valves 180 on the side of the color ink tanks are closed, the ink supply paths 155 of the supply tubes 15 and the channels of the atmosphere communication tubes 178 connected to the cyan ink tank 172, the magenta ink tank 173, and the yellow ink tank 174 are closed.

The manual valve 16 is arranged between the printhead 14 and ink tank valves 180 of the supply tubes 15 and switches between a communication state and a non-communication state of ink or air inside the supply tube. When the manual valve 16 is closed, the communication of the black ink supply tube 151, the cyan ink supply tube 152, the magenta ink supply tube 153, and the yellow ink supply tube 154 of the ink supply paths 155 are integrally blocked.

Figure 3:
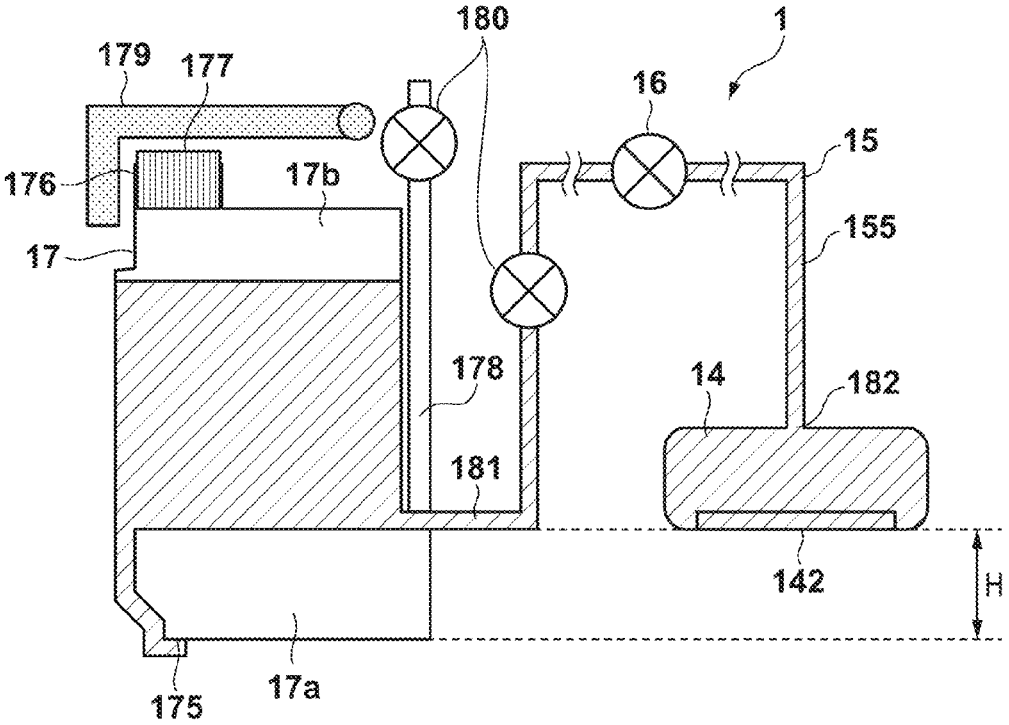
FIG. 3 is a schematic view showing the positional relationship of the ink tank and the printhead according to an embodiment.

FIG. 3 is a schematic view showing the positional relationship between the ink tank 17 and the printhead 14. In the printing apparatus 1, to prevent the leakage of ink from an ink ejection port 142 of the printhead 14, a gas/liquid exchange unit 175 of the ink tank 17 has been arranged at a position lower by a height H than the ink ejection port 142 of the printhead 14 in the height direction. That is, it is arranged so that a pressure due to a head difference corresponding to the height H is applied to the ink ejection port 142. Note that the gas/liquid exchange unit 175 is formed having an opening area which can maintain the meniscus of the ink. A buffer chamber 17a is arranged in the lower portion of the ink tank 17. The buffer chamber 17a can store ink that has been pressed out and has broken the meniscus of the gas/liquid exchange unit 175 when the air in an ink storage chamber 17b that stores the ink expands due to a pressure change or a temperature change. This prevents the ink from flowing through the atmosphere communication tube 178 and leaking from the ink tank 17.

Also, a joint portion 182 is a member connecting the channel between the supply tube 15 and the printhead 14, and is arranged in the detachment/attachment operation portion 143. When the user operates the detachment/attachment operation portion 143 in an opening direction to remove the printhead 14 from the carriage 13, the joint portion 182 is removed from the printhead 14. As a result, the connection between the supply tube 15 and the printhead 14 is blocked. Also, when the user is to attach the printhead 14 to the carriage 13, a pressing portion (not shown) can be pressed by closing the detachment/attachment operation portion 143 to implement the joint connection of the joint portion 182. The joint connection of the joint portion 182 allows the channel between the supply tube 15 and the printhead 14 to communicate, and allows ink to be supplied to the printhead 14.

The arrangement of the ink supply system and the sequence until a printing operation can be performed according to this embodiment will be described next with reference to FIGS. 1A, 1B, 2, and 3.

When ink is to be injected, the user will open the ink tank cover 179, remove the ink tank cap 177, and inject ink, from an ink bottle or the like, to the ink tank 17 from the ink injection port 176. At this time, the ink tank valves 180 will close interlockingly with the closing of the ink tank cover 179, thus closing the channel of the ink supply path 155 and the channel of the atmosphere communication tube 178. Also, when the injection of ink is completed, the user will use the ink tank cap 177 to seal the ink injection port 176, and close the ink tank cover 179. At this time, interlockingly with the closing of the ink tank cover 179, the ink tank valves 180 will switch from the closing state to the opening state, and the channel of the ink supply path 155 and the channel of the atmosphere communication tube 178 communicate as a result. That is, the channel of the ink supply path 155 and the channel of the atmosphere communication tube 178 are closed by the corresponding ink tank valves 180 while the ink tank cap 177 is removed and the ink injection port 176 is open to the atmosphere.

After detecting the completion of ink injection, the printing apparatus 1 can perform an ink suctioning operation from the ink ejection ports 142 by pressing suction caps 211 (see FIG. 6) on the ejection port surface of the printhead 14. The supply tubes 15 and the printhead 14 are filled with ink by this suction operation. Note that the detection of the completion of ink injection is performed by the cover sensor 18 detecting that the cover member 112 has been closed. However, the present invention is not limited to this. The completion of ink injection may be detected by causing a remaining amount detection unit that detects the amount of remaining ink in the ink tank 17 to detect that ink of an amount equal to or more than a predetermined amount has been injected. Subsequently, when ink is ejected from the ink ejection ports 142 of the ink-filled printhead 14 in accordance with the printing operation, the pressure inside the printhead 14 increases in correspondence with the amount of reduction of the ink, and ink is supplied from the ink tank 17 to the printhead 14. As a result, ink is continuously supplied from the ink tank 17 to the printhead 14 until the ink in the ink tank 17 is less than a predetermined amount.

Figure 4A:
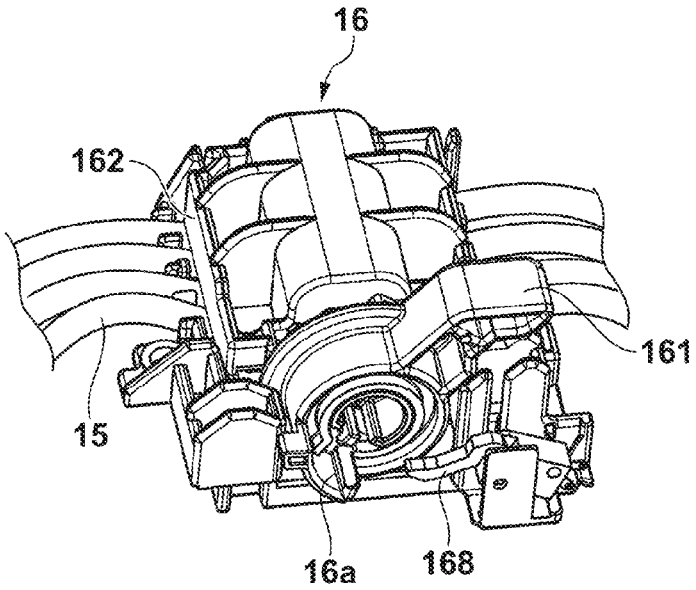
FIG. 4A is a perspective view schematically showing a manual valve in a state in which the manual valve is open according to an embodiment.
Figure 4B:
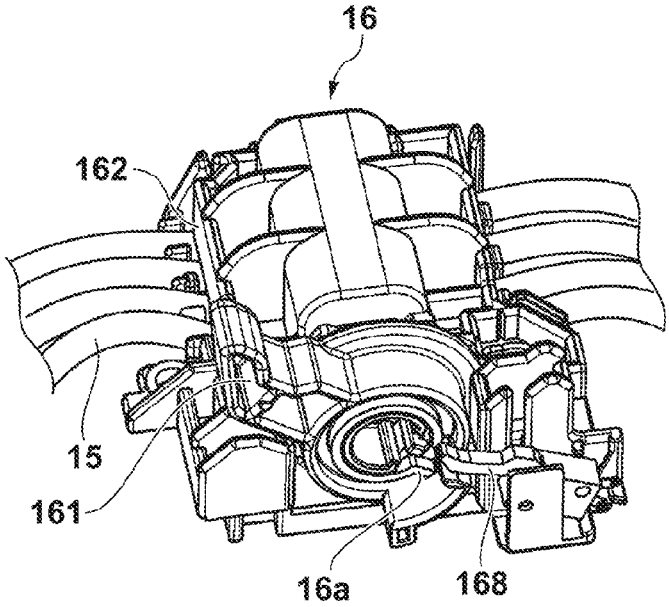
FIG. 4B is a perspective view schematically showing the manual valve in a state in which the manual valve is closed according to an embodiment.
Figure 5A:
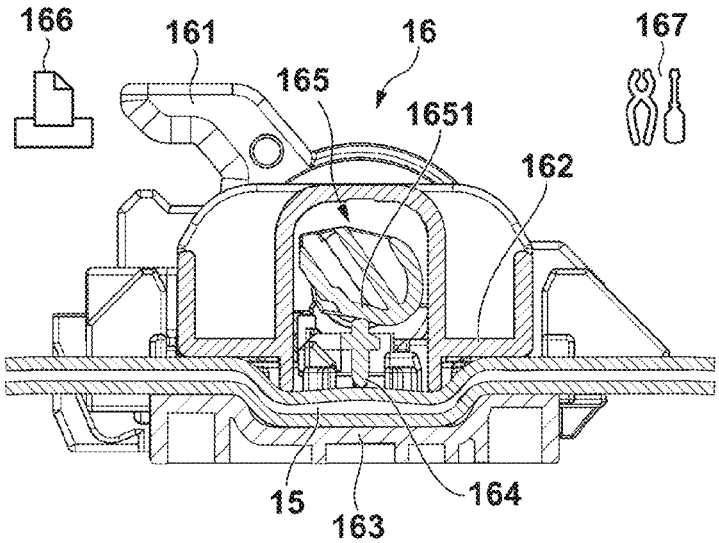
FIG. 5A is a sectional view schematically showing the manual valve in a state in which the manual valve is open according to an embodiment.
Figure 5B:
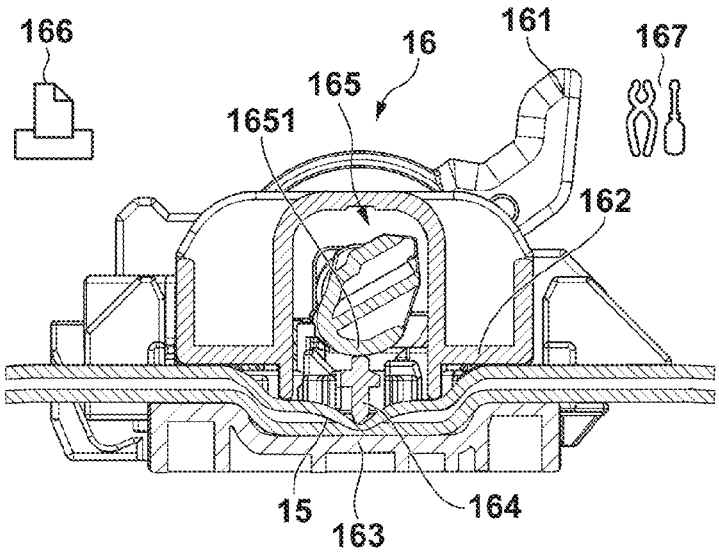
FIG. 5B is a sectional view schematically showing the manual valve in a state in which the manual valve is closed according to an embodiment.

The arrangement of the manual valve 16 according to this embodiment will be described next. FIGS. 4A and 4B are perspective views schematically showing the manual valve 16 according to this embodiment. In addition, FIGS. 5A and 5B are sectional views schematically showing the manual valve 16 according to this embodiment. The positions of the print mark 166 and the maintenance mark 167 shown in FIGS. 5A and 5B are virtual positions. In the printing apparatus 1, the print mark 166 and the maintenance mark 167 are arranged at the positions indicated in FIG. 1B.

The manual valve 16 includes the operating portion 161 which can be operated by the user, and a holding portion 162, a receiving member 163, a displacement member 164, and a cam 165.

The holding portion 162 holds the supply tubes 15. One end of each supply tube 15 is connected to the printhead 14 and the other end is connected to the ink tank 17. The supply tube 15 includes a bending region that can bend in accordance with the movement of the printhead 14. The manual valve 16 is arranged on the supply tube 15 so that the bending region will be between the printhead 14 and the holding portion 162. That is, the manual valve 16 is arranged in a region, of each supply tube 15, that will not move in accordance with the movement of the carriage 13. Also, although the supply tube 15 is fixed by a first fixing portion 184 on the side of the printhead 14 and a second fixing portion 183 on the side of the corresponding ink tank 17, the holding portion 162 also serves as the second fixing portion 183. As a result, the number of components can be reduced.

The displacement member 164 is a member that can be displaced in a direction that interferes with the supply tube 15. In other words, the displacement member 164 is arranged so as to be able to reciprocally move to and from the supply tube 15. Also, the receiving member 163 is a member to receive the displacement member 164 that is displaced in the direction that interferes with the supply tube 15. The receiving member 163 is arranged on the opposite side of the side on which the displacement member 164 is arranged with respect to the supply tube 15. The ink supply path 155 is closed when the displacement member 164 squashes the supply tube 15 by pressing the supply tube 15 against the receiving member 163.

The cam 165 displaces the displacement member 164. In this embodiment, the cam 165 is formed integrally with the operating portion 161. The cam 165 abuts against the displacement member 164 via a cam surface 1651. When the user operates the operating portion 161, the cam 165 rotates in accordance with the operation, and the displacement member 164 pressed by the cam surface 1651 is displaced. As a result, the user can make the ink supply path 155 close or communicate by the operating portion 161.

An operation in which the manual valve 16 closes the supply tube 15 according to this embodiment will be described next. FIG. 4A shows a state (open state) in which the displacement member 164 is not squashing the supply tube 15 and the ink supply path 155 communicates. At this time, the operating portion 161 is positioned on the side indicated by the print mark 166. In this state, ink inside the supply tube 15 can be supplied from the ink tank 17 to the printhead 14 via the ink supply path 155. When the user rotatably operates the operating portion 161 from this state to the side indicated by the maintenance mark 167, the cam surface 1651 of the cam 165 integrally arranged with the manual valve 16 will also rotate, and the cam surface 1651 will displace the displacement member 164 in the direction that interferes with the supply tube 15.

FIG. 4B shows a state (closing state) in which the displacement member 164 is squashing the supply tube 15 and the ink supply path 155 is closed. As shown in FIG. 5B, the supply tube 15 is squashed between the displacement member 164 and the receiving member 163, thus closing the ink supply path 155. At this time, the supply tube 15 is in a state in which the ink from the ink tank 17 cannot be supplied to the printhead 14. Also, if the ink is absent, the supply tube 15 will be in a state which is not in communication with the atmosphere.

Note that in this embodiment, the supply tubes 15 of the ink supply paths 155 of all of the ink colors are simultaneously closed by the closing of the manual valve 16. However, a plurality of manual valves 16 may be provided so that each ink supply path 155 can be individually closed by arranging a manual valve for the supply tube 15 of each ink color. Alternatively, the manual valve 16 may be arranged on each of the black ink side and the color ink side.

Referring to FIGS. 1A and 1B again, the operating portion 161 is arranged at a position covered by the housing 11 and the cover member 112 as shown in FIG. 1A. That is, the operating portion 161 is arranged so as to be exposed when the cover member 112 is opened. The printing apparatus 1 is controlled not to perform the printing operation by the printhead 14 while the cover sensor 18 detects the opening state of the cover member 112. Arranging the operating portion 161 in the inner side of the cover member 112 can suppress the user from erroneously operating the operating portion 161 while the printing apparatus 1 is performing a printing operation or the like.

Also, since the cover sensor 18 is arranged in this embodiment, the printing apparatus 1 can use the cover sensor 18 to detect whether it is in a state in which the user can operate the operating portion 161. In this case, the cover sensor 18 is not limited to a mechanical sensor that detects a mechanical contact, but also may be, for example, an optical sensor or the like.

In addition, as shown in FIGS. 4A and 4B, a manual valve sensor 168 that detects the opening/closing state of the manual valve 16 is arranged in the manual valve 16. In this embodiment, the manual valve sensor 168 is a switch which operates mechanically. When the user operates the operating portion 161, an operating member 16a provided on the operating portion 161 moves a movable portion of the manual valve sensor 168 and causes the manual valve sensor 168 to operate. As a result, the closing state and the opening state of the manual valve 16 can be detected. Note that an optical sensor or another known arrangement can be adopted as the manual valve sensor 168.

Figure 6:
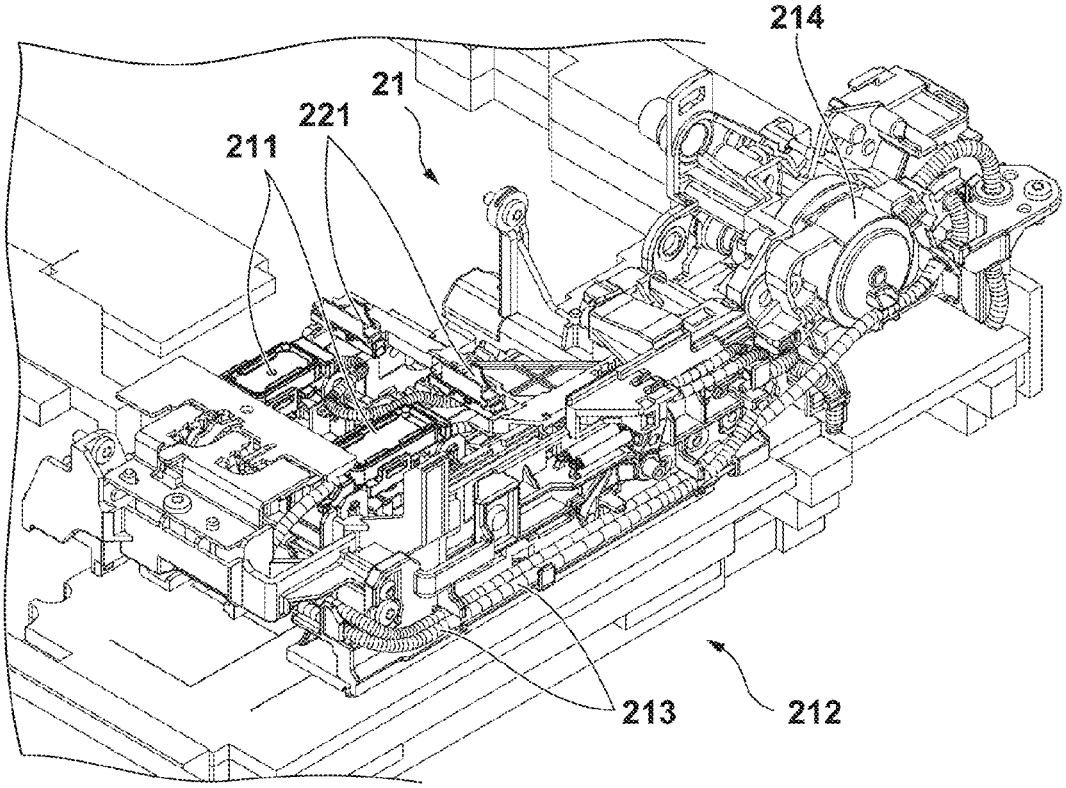
FIG. 6 is a perspective view schematically showing a recovery unit according to an embodiment.

FIG. 6 is a perspective view schematically showing the recovery unit 21. In this embodiment, the printing apparatus 1 includes the recovery unit 21 for maintaining or recovering the ejection performance (printing performance) of the printhead 14. In this embodiment, the recovery unit 21 is arranged in a main body 111 of the housing 11. The recovery unit 21 includes, the suction caps 211 that cap the printhead 14, and a suction mechanism 212 that sucks ink in the suction caps 211. The suction mechanism 212 includes suction tubes 213, each connected to a corresponding one of the suction caps 211, and a suction pump 214 that sucks ink in the suction caps 211 via the suction tubes 213. In this case, each suction tube 213 is a suction path forming member that forms an ink suction path 2131 (see FIG. 7) for sucking the ink inside the corresponding suction cap 211. Also, in this embodiment, the suction tubes 213 is formed by a flexible member such as an elastomer or the like in a manner similar to the supply tube 15.

In addition, the recovery unit 21 includes wipers 221 for wiping the ejection surfaces of the ink ejection ports 142, holding members (not shown) for holding the wipers 221, and ink removing members (not shown) for removing ink which adhered to the wipers 221. Note that since these components are well-known to those skilled in the art, a description will be omitted.

Figure 7:
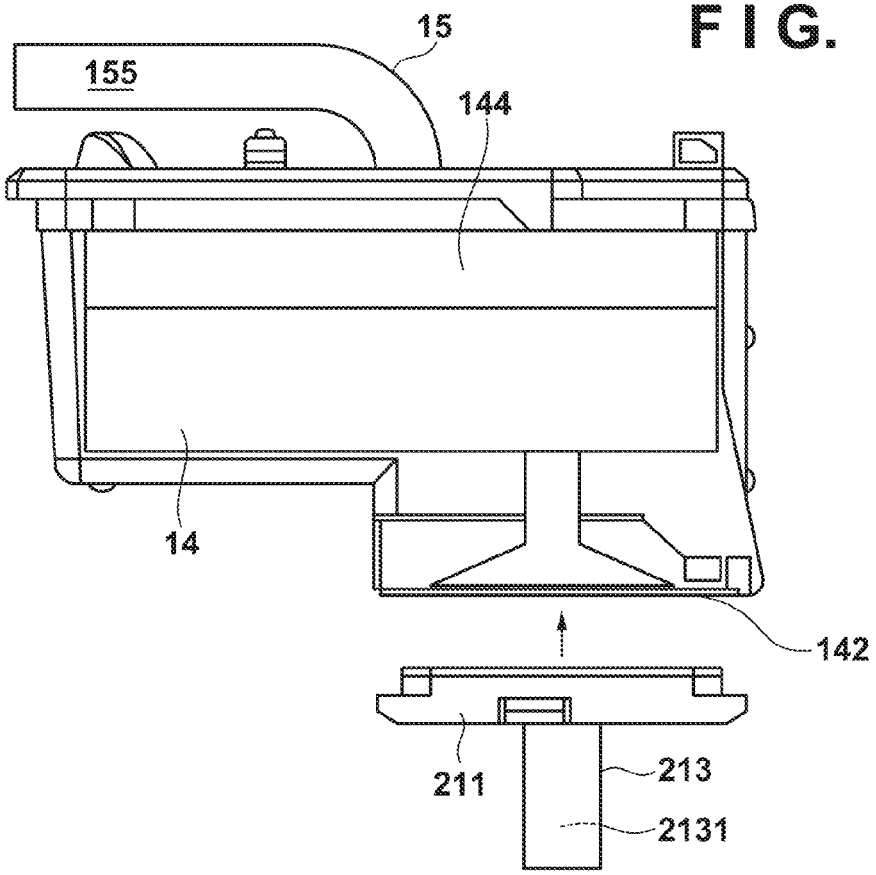
FIG. 7 is a view schematically showing the printhead and a suction cap according to an embodiment.

FIG. 7 is a view schematically showing the printhead 14 and the suction cap 211. The supply tube 15 is connected to the upper portion of the printhead 14. Also, the suction cap 211 is arranged to be able to reciprocally move to/from the ink ejection ports 142 of the printhead 14 by a cap driving unit 217 (see FIG. 9) (to be described later), and is able to cap, from below, the ejection surface on which the ink ejection ports 142 are arranged. The printhead 14 is never completely filled with ink, and an air space 144 is constantly present in the printhead. Note that each suction cap 211 is arranged at a predetermined position in the printing apparatus 1. When the recovery operation is to be performed, the carriage 13 moves the printhead 14 to the recovery position on the upper side of each suction cap 211.

Figure 8:
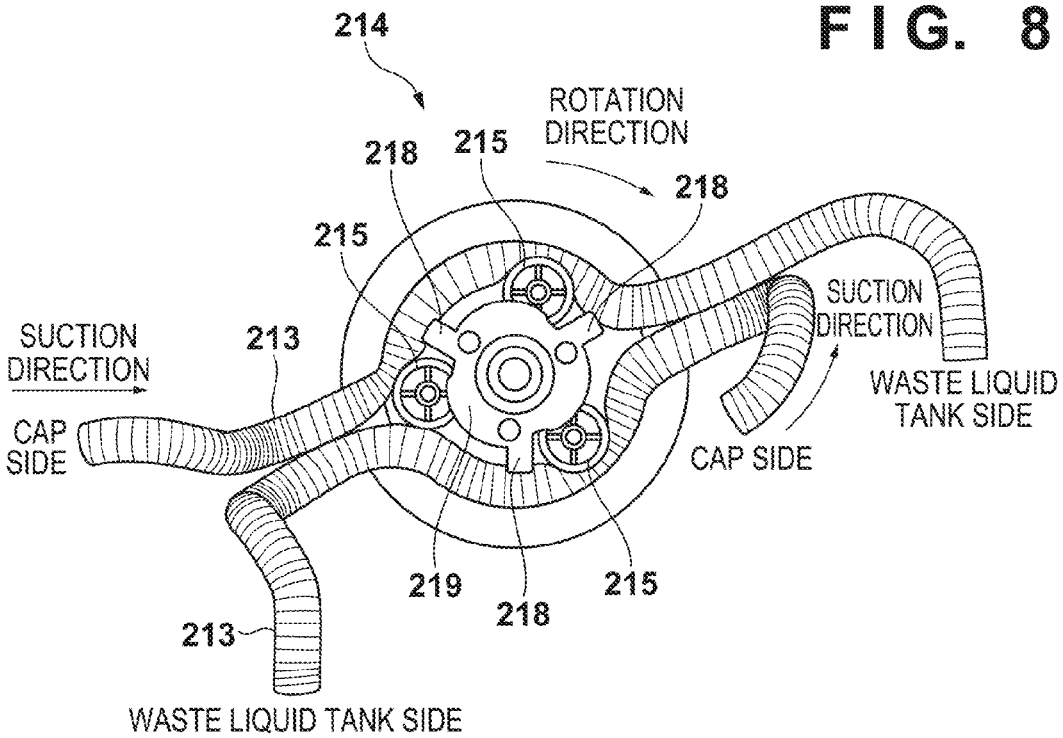
FIG. 8 is a view schematically showing a suction pump according to an embodiment.

An operation to suck ink in each suction cap 211 by the suction mechanism 212 will be described here. FIG. 8 is a sectional view schematically showing the suction pump 214. In this embodiment, the suction mechanism 212 includes two suction tubes 213, that is, a suction tube for black ink and a suction tube for color inks.

The suction pump 214 includes rollers 215, a pump driving unit 216 (see FIG. 9), a rotating member 219 that rotates in accordance with the rotation of the pump driving unit 216, and roller driving members 218 arranged so as to protrude outward from the rotating member 219 in the radial direction.

The rollers 215 are arranged so as to be able to revolve about the rotation axis of the rotating member 219. When the rotating member 219 rotates (rotates about its axis), the roller driving members 218 revolve about the axis of the rotating member 219. The rollers 215 revolve about the axis of the rotating member 219 as the roller driving members 218 revolve about the rotating member 219 in a state in which the roller driving members are abutting against the rollers 215. The suction mechanism 212 performs a suction operation by causing negative pressure to be generated in the suction caps 211 by making the rollers 215 squeeze the suction tubes 213 by causing the rollers 215 to revolve around the rotating member 219 in a state in which the ink ejection ports 142 are covered by the suction caps 211.

In this embodiment, the two suction tubes 213 are vertically arranged with the rotating member 219 sandwiched between them. Also, three rollers 215 are arranged in this embodiment, and suction is simultaneously performed in the two suction tubes 213 by sequentially squeezing the suction tubes 213 by the rotation of the three rollers.

In addition, one end of each suction tube 213 is connected to a waste liquid tank (not shown), and the ink sucked by the suction pump 214 is ejected to the waste liquid tank via the suction tubes 213.

Furthermore, in this embodiment, the suction pump 214 can close each ink suction path 2131 by stopping the driving of the pump driving unit 216 in a state in which the rollers 215 are squashing the suction tubes 213. That is, in this embodiment, the suction pump 214 also acts as a closing valve of the ink suction paths 2131. Hence, since the suction pump 214 which is used for a recovery operation and is conventionally included in the printing apparatus 1 can also act as the closing valve of the ink suction paths 2131, it becomes possible to reduce the number of components used in the printing apparatus 1. However, it is also possible to adopt an arrangement in which a closing valve for each ink suction path 2131 is arranged separately from the suction pump 214. In such a case, it is possible to adopt a valve having various kinds of arrangements such as a valve that can be manually operated in the manner of the manual valve 16, a valve that can be automatically opened and closed by a driving source such as a motor, and the like.

<Hardware Arrangement>

Figure 9:
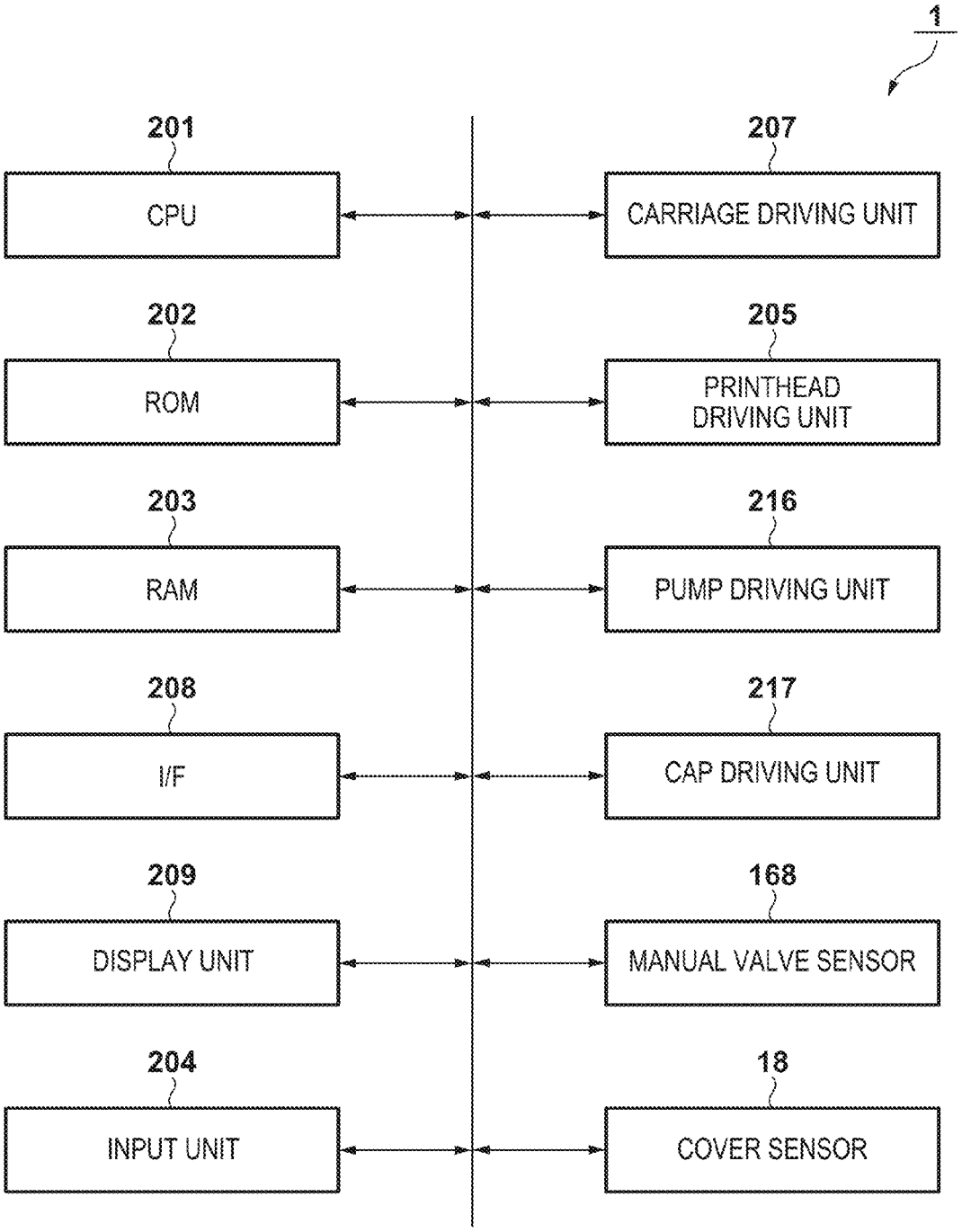
FIG. 9 is a block diagram showing an example of the hardware arrangement of the printing apparatus according to an embodiment.

FIG. 9 is a block diagram showing an example of the hardware arrangement of the printing apparatus 1. A CPU 201 integrally controls the printing apparatus 1. A ROM 202 stores control programs, various kinds of data, and the like of the CPU 201. A RAM 203 temporarily stores various kinds of data. For example, the CPU 201 executes operation control and data processing of the printing apparatus 1 by reading out a program stored in the ROM 202 to the RAM 203 and executing the program.

The printhead 14 ejects ink to the print medium 19 in accordance with the control signals transmitted from the CPU 201. A carriage driving unit 207 includes, for example, a motor, and moves the carriage 13 in accordance with the control signals transmitted from the CPU 201 via a motor driver (not shown). At this time, for example, the rotation movement of the motor is converted into a reciprocal movement by a rack and pinion mechanism (not shown) or the like. The pump driving unit 216 includes, for example, a motor, and drives the suction pump 214 in accordance with the control signal transmitted from the CPU 201 via a motor driver (not shown). The cap driving unit 217 includes, for example, a motor, and drives the suction caps 211 in accordance with the control signals transmitted from the CPU 201 via a motor driver (not shown). At this time, for example, the rotation movement of the motor is converted into a reciprocal movement by a rack and pinion mechanism (not shown) or the like. An external OF 208 connects to a PC or the like to receive print data or the like and transmit a status signal or the like.

The CPU 201 performs recovery control of the printhead 14 by transmitting control signals to the carriage driving unit 207, the suction pump 214, and the suction caps 211. A display unit 209 displays various kinds of user interface screens such as apparatus information, a setting screen, job information, and the like. As an example, the display unit 209 is a liquid crystal display. For example, the display unit 209 can be arranged at a position, on the main body 111 of the housing 11, which can be easily visually recognized by the user. An input unit 204 accepts inputs from the user. For example, the input unit 204 can be a touch panel or a hard key. The detection results of the cover sensor 18 and the manual valve sensor 168 are transmitted to the CPU 201. Note that FIG. 9 is a schematic view mainly showing an arrangement according to the embodiment, and the printing apparatus 1 may have another arrangement.

<Operation of Printing Apparatus>

The operation of the printing apparatus 1 will be described. Supplying of ink from the ink tank 17 to the printhead 14 may fail if the user erroneously closes the manual valve 16 during the printing operation of the printing apparatus 1. As described above, in the printing apparatus 1 according to the first embodiment, an erroneous operation of the manual valve 16 by the user is suppressed by arranging the operating portion 161 so that it is covered by the cover member 112. In addition to this, the following processing is performed to more effectively prevent an erroneous operation of the manual valve 16 by the user during a printing operation.

Figure 10:
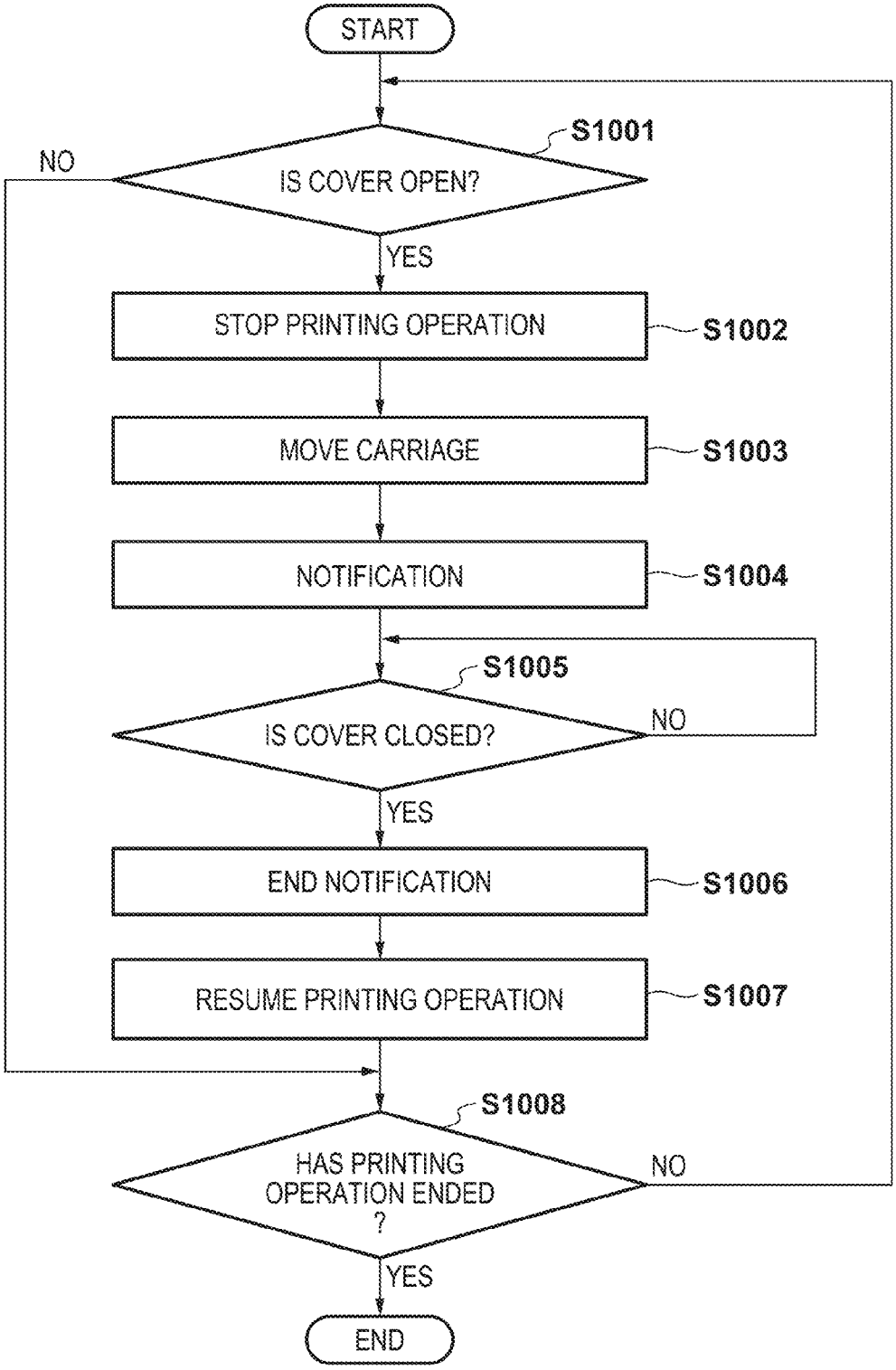
FIG. 10 is a flowchart showing an example of processing performed by a CPU to prevent an erroneous operation of the manual valve by a user according to an embodiment.

FIG. 10 is a flowchart showing an example of processing performed by the CPU 201 to prevent the erroneous operation of the manual valve 16 by the user during a printing operation. For example, the processing of this flowchart is implemented by the CPU 201 reading out a program stored in the ROM 202 to the RAM 203 and executing the program. In addition, for example, the processing of this flowchart is started when the printing apparatus 1 starts a printing operation.

In step S1001, the CPU 201 confirms whether the cover member 112 is open. For example, the CPU 201 confirms the opening/closing state of the cover member 112 based on a detection result from the cover sensor 18. If the CPU 201 determines that the cover member 112 is open, the process advances to step S1002. Otherwise, the process advances to step S1008. In step S1002, the CPU 201 stops the printing operation.

Figure 11:
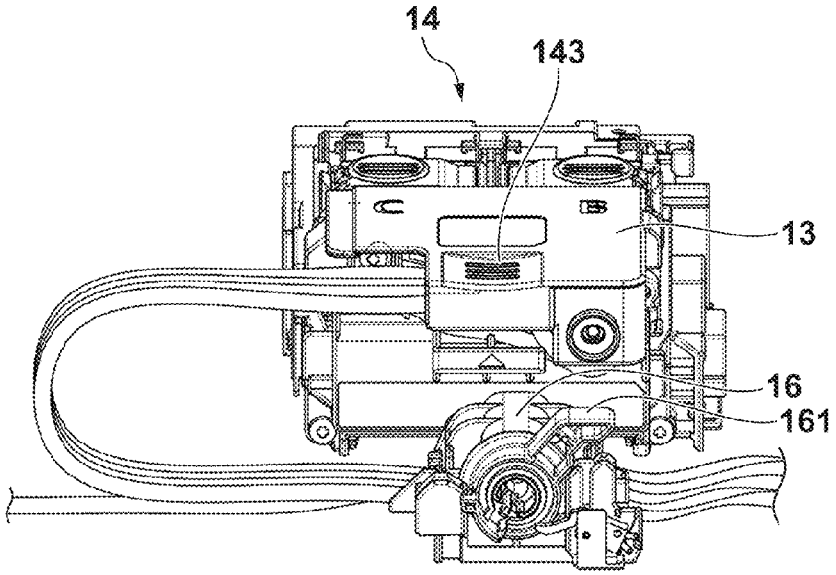
FIG. 11 is a perspective view showing the positional relationship between the manual valve and a carriage according to an embodiment.

In step S1003, the CPU 201 moves the carriage 13. FIG. 11 will be referred in this case. FIG. 11 is a perspective view showing the positional relationship of the manual valve 16 and the carriage 13. In this embodiment, the CPU 201 stops the carriage 13 above the operating portion 161 so as to cover the operating portion 161. For example, the carriage 13 can be stopped at a position in which the operating portion 161 will be at least partially covered by the detachment/attachment operation portion 143 of the carriage 13. As a result, it will become difficult for the user to operate the manual valve 16, thus preventing an erroneous operation of the manual valve 16 by the user.

In step S1004, the CPU 201 notifies the user. The contents of the notification suffice to be a notification prompting the user not to operate the operating portion 161. For example, the CPU 201 can transmit a notification prompting the user to close the cover member 112 or a notification prompting the user not to operate the operating portion 161. The CPU 201 makes the notification by, for example, causing the display unit 209 to display a message or causing a terminal, such as a PC or the like which is connected via the I/F 208, to display a message. The CPU 201 may also make the notification by voice.

In step S1005, the CPU 201 confirms whether the cover member 112 has been closed. For example, the CPU 201 confirms the opening/closing state of the cover member 112 based on the detection result from the cover sensor 18. If the CPU 201 determines that the cover member 112 has been closed, the process advances to step S1006. Otherwise, the process of step S1005 is repeated until the cover member is closed.

In step S1006, the CPU 201 ends the notification. In step S1007, the CPU 201 confirms whether the printing operation has been completed. If the CPU 201 determines that the printing operation has not been completed, the process returns to step S1001. Otherwise, the processing of this flowchart ends.

As described above, since the printing apparatus 1 operates so the user will not operate the operating portion 161 when the cover member 112 is opened during a printing operation, an erroneous operation of the manual valve 16 by the user can be prevented. Note that the movement of the carriage 13 in step S1002 and the notification performed in step S1003 are processing operations performed to suppress an erroneous operation of the manual valve 16 by the user, and it may be arranged so that only one of these processing operations will be performed. Also, the CPU 201 may perform the notification operation of step S1003 not only during a printing operation, but also in other states in which the cover member 112 need not be opened.

FIG. 12 is a flowchart showing an example of processing performed by the CPU 201 when the printhead 14 is to be replaced. In a case in which the printhead 14 needs to be replaced, the printing apparatus 1 will notify the user of the replacement operation of the printhead 14. Subsequently, the processing shown in FIG. 12 will be started. For example, the processing of this flowchart is implemented by the CPU 201 reading out a program stored in the ROM 202 to the RAM 203 and executing the program.

In step S1201, the CPU 201 moves the carriage 13 so that the printhead 14 will be positioned at a cap position facing the suction caps 211.

In step S1202, the CPU 201 notifies the user to open the cover member 112. The CPU 201 can notify the user by, for example, causing the display unit 209 to display a message prompting the user to open the cover member 112 or by generating a voice message.

In step S1203, the CPU 201 confirms whether the cover member 112 has been opened based on the detection result from the cover sensor 18. If the CPU 201 determines that the cover member 112 is open, the process advances to step S1204. If the cover member 112 is closed, the process of step S1203 is repeated. Note that the CPU 201 may confirm whether the cover member 112 has been opened based on whether the input unit 204 has accepted an opening operation completion input from the user.

In step S1204, the CPU 201 notifies the user to close the manual valve 16. The CPU 201 causes, for example, the display unit 209 to display a message. Note that at this time, the carriage 13 is positioned at the cap position, and the detachment/attachment operation portion 143 is covered by the main body 111 of the housing 11. This will prevent the user from erroneously operating the detachment/attachment operation portion 143 in a state in which the manual valve 16 is open. Note that the position of the carriage 13 is not limited to the cap position and suffices to be a position where the detachment/attachment operation portion 143 will be covered by the main body 111.

In step S1205, the CPU 201 confirms whether the manual valve 16 has been closed. For example, the CPU 201 confirms whether the manual valve 16 has been closed based on the detection result from the manual valve sensor 168. If the CPU 201 confirms that the manual valve 16 has been closed, the process advances to step S1206. Otherwise, the process of step S1205 is repeated.

Note that the CPU 201 can confirm that the operation of the manual valve 16 has been completed based on the fact that the input unit 204 has accepted an input, from the user, indicating the completion of the operation of the manual valve 16. As a result, the CPU 201 can confirm whether the manual valve 16 is closed even in a case in which the manual valve sensor 168 has not been arranged.

In step S1206, the CPU 201 moves the carriage 13 to a head replacement position. The head replacement position is, for example, a position where the printhead 14 is exposed from the opening portion 111a. At this time, as shown in FIG. 11 described above, the CPU 201 may set a position where the operating portion 161 is at least partially covered by the carriage 13 as the head replacement position of the carriage 13. This can prevent the user from erroneously operating the operating portion 161 and setting the manual valve 16 in the opening state.

In step S1207, the CPU 201 makes a notification prompting the user to perform the replacement operation of the printhead 14 by, for example, causing the display unit 209 to display a message. In step S1208, the CPU 201 confirms whether the printhead 14 has been replaced. If the CPU 201 determines that the printhead has been replaced, the process advances to step S1209. Otherwise, the process of step S1208 is repeated. As an example, the CPU 201 may detect the completion of the replacement operation of the printhead 14 by an input from the user to the input unit 204.

In step S1209, the CPU 201 notifies the user to make an operation to set the manual valve 16 in the opening state. For example, the CPU 201 notifies the user by causing the display unit 209 to display a message.

In step S1210, the CPU 201 confirms whether the manual valve 16 has been returned to the opening state. If the CPU 201 determines that the manual valve 16 has been opened, the process advances to step S1211. Otherwise, the process of step S1210 is repeated. For example, the CPU 201 confirms whether the manual valve 16 has been returned to the opening state based on the detection result from the manual valve sensor 168. However, the completion of the user's operation of the manual valve 16 may be detected by an input to the input unit 204 from the user.

In step S1211, the CPU 201 notifies the user to close the cover member 112. For example, the CPU 201 notifies the user by, for example, causing the display unit 209 to display a message prompting the user to close the cover member 112 or by generating a voice message.

In step S1212, the CPU 201 confirms whether the cover member 112 has been closed based on the detection result from the cover sensor 18. If the CPU 201 determines that the cover member 112 is closed, the process advances to step S1213. If the cover member 112 is open, the process of step S1212 is repeated. Note that the CPU 201 may confirm the whether the cover member is closed based on whether a closing operation complete input from the user has been accepted by the input unit 204.

In step S1213, the CPU 201 moves the carriage 13 to the cap position. In step S1214, the CPU 201 brings the suction caps 211 into tight contact with the ejection surface of the printhead 14, and drives the suction pump 214. As a result, the printhead 14 is filled with ink, and the processing of the flowchart ends.

As described above, when the printhead 14 is to be replaced, an erroneous operation by the user can be prevented by prompting the user to open or close the manual valve 16 as needed. In addition, since the replacement notification of the printhead 14 is performed upon confirming that the manual valve 16 is closed, it is possible to suppress ink leakage at the time of the replacement.

FIG. 13 is a flowchart showing an example of the processing performed by the CPU 201 at the time of a transportation setting mode. In a case in which the printing apparatus 1 is to be transported from the user to a service facility for maintenance or to repair the printing apparatus 1, a measure may need to be taken to prevent ink leakage at the time of transportation. Also, in a case in which the printing apparatus 1 is to be stored without use over a long period, the manual valve 16 may be closed. Hence, in the printing apparatus 1 according to this embodiment, a series of processing prompting the user to operate the manual valve will be performed when the control mode is set in the transportation setting mode. For example, the processing of this flowchart is implemented by the CPU 201 reading out a program stored in the ROM 202 to the RAM 203 and executing the program.

The processes from step S1301 to step S1305 correspond to the processes from step S1201 to step S1205. Also, the processes of steps S1306 and S1307 correspond to the processes of steps S1211 and S1212. In step S1308, the CPU 201 brings the suction caps 211 into tight contact with the ejection surface of the printhead 14. In step S1309, the CPU 201 performs software shutdown processing, and the processing of the flowchart ends.

As described above, in the case of the transportation setting mode, the CPU 201 performs the software shutdown processing after confirming that the manual valve 16 is closed. Hence, a state in which the printing apparatus 1 is powered off when the transportation setting mode has been selected is always a state in which the manual valve 16 is closed. As a result, it is possible to prevent the user from forgetting to take a measure against ink leakage when the printing apparatus is to be transported from the user to a service facility.

<Effects>

As described above, in the printing apparatus 1 according to the first embodiment, the operating portion 161 is arranged at a position where it will be exposed when the cover member 112 is opened. Hence, the user will need to always open the cover member 112 before operating the manual valve 16, and it is possible to prevent an erroneous operation of the operating portion 161 by the user. Also, at the time of the replacement of the printhead 14, since the user is prompted to replace the printhead 14 after the manual valve 16 is closed, it is possible to prevent ink leakage that can occur due to the user replacing the printhead 14 in a state in which the manual valve 16 is open. In this case, if the distance between the manual valve 16 and the detachment/attachment operation portion 143 is long, the user may replace the printhead 14 even though he/she has forgotten to operate the manual valve 16. However, in this embodiment, by moving the detachment/attachment operation portion 143 to a position where it is covered by the main body 111 of the housing 11, it is possible to prevent the user from replacing the printhead 14 until the manual valve 16 has been closed.

In addition, since selecting the transportation setting mode when the printing apparatus 1 is to be transported will allow the power to be turned off in a state in which the manual valve 16 is closed, it is possible to prevent the user from forgetting to close the manual valve 16. Also, since the manual valve 16 is closed at the time of transportation, ink leakage from the printhead 14 can be reduced, for example, even in a case in which the suction caps 211 and the printhead 14 are separated due to an impact to the printing apparatus 1 during the transportation. This is particularly effective in reducing the contamination of the printing apparatus 1 by suppressing the ink in the ink tank 17 from leaking from the printhead 14 during transportation in a case in which the ink tank 17 is large. Furthermore, the printing apparatus 1 can also notify the user not to operate the manual valve 16 when the cover sensor 18 has detected that the cover member 112 has been opened during a printing operation.

In addition, in this embodiment, the manual valve 16 is arranged to fall within the width 112a of the cover member 112 and the maximum-printable-size print medium width 191. Therefore, the length of each supply tube 15 from the corresponding ink tank 17 to the printhead 14 can be reduced, and it is possible to reduce the size of the printing apparatus 1 and the component cost of each supply tube 15.

Other Embodiments

The arrangement of a manual valve according to other embodiments will be described. Note that the same reference numerals denote arrangements which are the same as those of the first embodiment, and thus a description may be omitted.

Figure 14A:
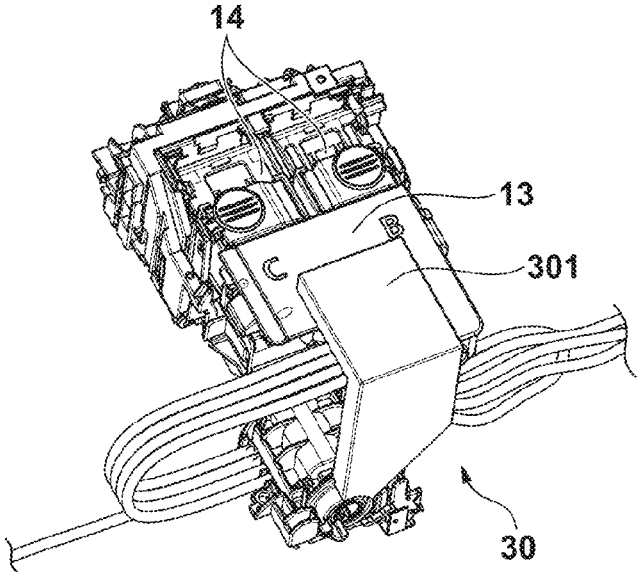
FIG. 14A is a perspective view schematically showing a manual valve in a state in which the manual valve is open according to another embodiment.
Figure 14B:
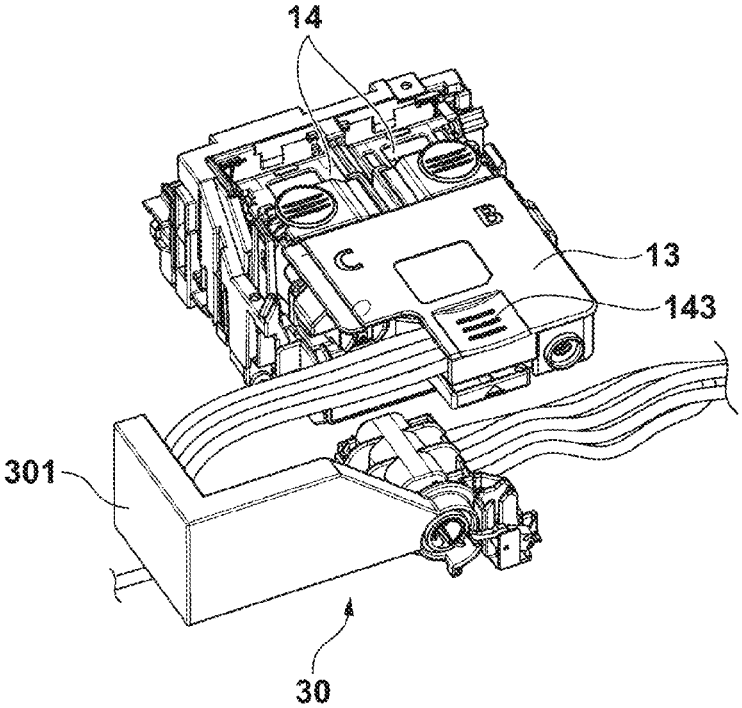
FIG. 14B is a perspective view schematically showing the manual valve in a state in which the manual valve is closed according to another embodiment.

FIGS. 14A and 14B are perspective views schematically showing a manual valve 30 according to another embodiment. The manual valve 30 is different from a manual valve 16 according to the first embodiment in the point that it is formed to have a shape in which an operating portion 301 can cover a detachment/attachment operation portion 143. In a state in which the manual valve 30 is open as shown in FIG. 14A, the detachment/attachment operation portion 143 of a carriage 13 is covered by the operating portion 301 of the manual valve 30, and the user cannot operate the detachment/attachment operation portion 143. On the other hand, in a state in which the manual valve 30 is closed as shown in FIG. 14B, the operating portion 301 is positioned at a position where the detachment/attachment operation portion 143 can be operated. As a result, it is possible to prevent ink leakage from occurring when a printhead 14 is removed in a state in which the manual valve 30 is open. That is, the operating portion 301 has a function to suppress the user from replacing the printhead 14 at a wrong timing.

Figure 15A:
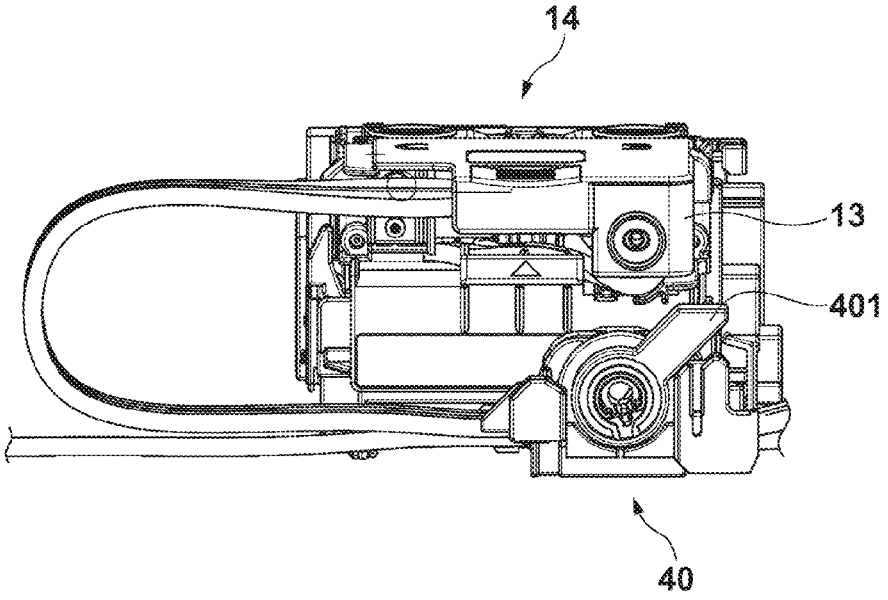
FIG. 15A is a perspective view schematically showing a manual valve in a state in which the manual valve is open according to another embodiment.
Figure 15B:
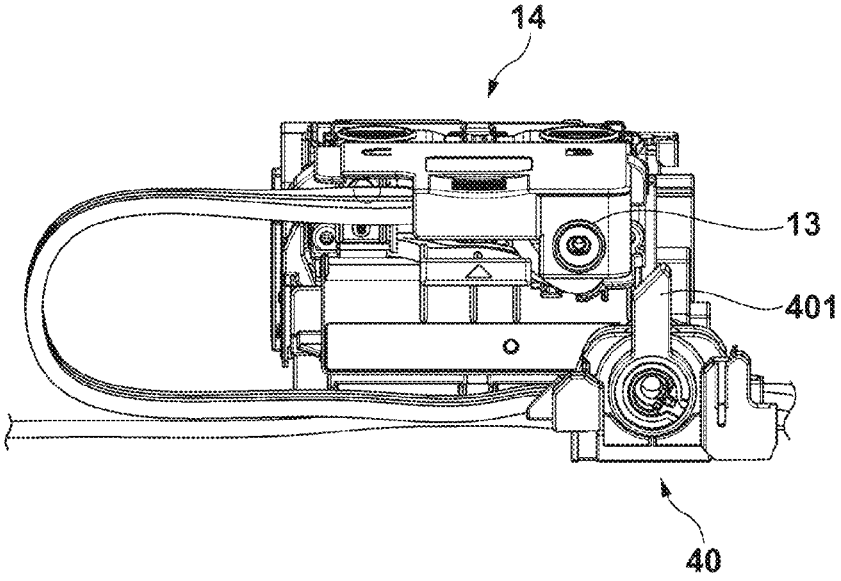
FIG. 15B is a perspective view schematically showing the manual valve in a state in which the manual valve is closed according to another embodiment.

FIGS. 15A and 15B are perspective views schematically showing a manual valve 40 according to another embodiment. As shown in FIG. 15B, an operating portion 401 is arranged to be in a positional relationship in which it will partially abut against a carriage 13 when the manual valve 40 is in the closing state. Also, as shown in FIG. 15A, the operating portion 401 is arranged to be in a positional relationship in which it will not abut against the carriage 13 when the manual valve 40 is in the opening state. As a result of such an arrangement, this embodiment can make the manual valve 40 switch from the closing state to the opening state by causing the carriage 13 to move while abutting against the operating portion 401 from the state of FIG. 15B to the state of FIG. 15A. That is, the operating portion 401 moves interlockingly with the movement of the carriage 13, and the manual valve 40 can be switched from the closing state to the opening state. For example, in the transportation setting mode described above, a CPU 201 can cause the carriage 13 to move to close the manual valve 40 and perform the shutdown processing when the user selects this mode. On the other hand, since the manual valve 40 in the opening state does not abut against the carriage 13, there is no influence on the printing operation. As a result, it allows the manual valve 40 to switch from the closing state to the opening state without an operation by the user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073078, filed on Apr. 5, 2019, which is hereby incorporated by reference herein in its entirety.

What is claimed is:

1. A printing apparatus comprising:

an ink tank configured to store ink to be supplied to a printhead configured to eject ink;

an ink supply path configured to supply ink from the ink tank to the printhead;

a conveying unit configured to convey a print medium to the printhead;

a cover member arranged so as to be able to open and close with respect to the printing apparatus;

a manual valve that [is arranged in a region through which the print medium conveyed by the conveying unit passes and] can be switched between an opening state in which the ink supply path is opened and a closing state in which the ink supply path is closed; [and]

[an operating portion] *a valve lever handle* that is arranged at a position which is exposed when the cover member is opened and can be operated *by a user* to switch the manual valve*; and*

*a central processing unit,*

*wherein, in a case where a transportation mode for transporting the printing apparatus is selected by a user, the central processing unit is programmed to execute:*

*(1) displaying a message prompting the user to close the manual valve on a display provided with the printing apparatus;*

*(2) confirming whether or not the manual valve is in the closing state after the displaying; and*

*(3) shutdown processing to power off the printing apparatus after confirmation that the manual valve is in the closing state.*

2. The printing apparatus according to claim 1, further comprising:

a first detection unit configured to detect an opening/closing state of the cover member.

3. The printing apparatus according to claim 2, [further comprising: a notification unit configured to notify] *wherein the central processing unit is programmed to execute notifying* a user not to operate the [operating portion] *valve lever handle* in a case where the first detection unit detects a state in which the cover member is open.

4. The printing apparatus according to claim 2, further comprising:

a carriage configured to detachably carry the printhead and move reciprocally, wherein the carriage moves to a position to obstruct the operation of the [operating portion] *valve lever handle* in a case where the first detection unit detects a state in which the cover member is open.

5. The printing apparatus according to claim 4, [comprising: a notification unit configured to notify] *wherein the central processing unit is programmed to execute notifying* a user to operate the [operating portion] *valve lever handle* to set the manual valve in the closing state when the printhead requires replacement.

6. The printing apparatus according to claim 4, further comprising:

a second detection unit configured to detect the opening/closing state of the manual valve.

7. The printing apparatus according to claim 6, wherein the carriage moves to a replacement position where the printhead is detachable in a case where the second detection unit detects the closing state of the manual valve.

8. The printing apparatus according to claim 1, wherein the ink supply path is formed by a tube.

[9. The printing apparatus according to claim 1, further comprising:

a preventing unit configured to prevent removal of the printhead in a case where the manual valve is in the opening state.]

10. The printing apparatus according to claim 1, wherein the ink tank includes an injection port to which ink is injected.

11. The printing apparatus according to claim 1, further comprising the printhead.

12. A printing apparatus comprising:

a carriage configured to detachably carry a printhead configured to eject ink;

an ink tank configured to store ink to be supplied to the printhead;

an ink supply path configured to supply ink from the ink tank to the printhead;

a manual valve that is arranged on the ink supply path and can be switched between an opening state in which the ink supply path is opened and a closing state in which the ink supply path is closed; [and]

[an operating portion that switches] *a valve lever handle configured to be operated by a user to switch* the manual valve*; and* [by movement of the carriage]

*a central processing unit,*

*wherein, in a case where a transportation mode for transporting the printing apparatus is selected by a user, the central processing unit is programmed to execute:*

*(1) displaying a message prompting the user to close the manual valve on a display provided with the printing apparatus;*

*(2) confirming whether or not the manual valve is in the closing state after the displaying; and*

*(3) shutdown processing to power off the printing apparatus after confirmation that the manual valve is in the closing state.*

13. The printing apparatus according to claim 12, further comprising the printhead.

14. A printing apparatus comprising:

a tank configured to store liquid to be supplied to a printhead configured to eject liquid;

a supply path configured to supply liquid from the tank to the printhead;

a conveying unit configured to convey a print medium;

a cover member arranged so as to be able to open and close with respect to the printing apparatus;

a valve [arranged above a region through which the print medium conveyed by the conveying unit passes and] switchable between an opening state in which the supply path is opened and a closing state in which the supply path is closed; [and]

[an operating portion] *a valve lever handle* arranged at a position which is exposed in a state where the cover member is opened, and *configured to be* operatable *for a user to switch* the valve*; and*

*a central processing unit,*

*wherein, in a case where a transportation mode for transporting the printing apparatus is selected by a user, the central processing unit is programmed to execute:*

*(1) displaying a message prompting the user to close the valve on a display provided with the printing apparatus;*

*(2) confirming whether or not the valve is in the closing state after the displaying; and*

*(3) shutdown processing to power off the printing apparatus after confirmation that the valve is in the closing state.*

15. The printing apparatus according to claim 14, further comprising:

a first detection unit configured to detect an opening/closing state of the cover member.

16. The printing apparatus according to claim 15, [further comprising: a notification unit configured to notify] *wherein the central processing unit is programmed to execute notifying* a user not to operate the [operating portion] *valve lever handle* in a case where the first detection unit detects that the cover member is opened.

17. The printing apparatus according to claim 15, further comprising:

a carriage configured to detachably carry the printhead and move reciprocally, wherein the carriage moves to a position to obstruct the operation of the [operating portion] *valve lever handle* in a case where the first detection unit detects that the cover member is opened.

18. The printing apparatus according to claim 17, [comprising: a notification unit configured to notify] *wherein the central processing unit is programmed to execute notifying* a user to operate the [operating portion] *valve lever handle* to set the valve in the closing state in a case where the printhead requires replacement.

19. The printing apparatus according to claim 17, further comprising:

a second detection unit configured to detect the opening/closing state of the valve.

20. The printing apparatus according to claim 19, wherein the carriage moves to a replacement position where the printhead is detachable in a case where the second detection unit detects the closing state of the valve.

*21. A printing apparatus comprising:*

*a first tank and a second tank configured to store liquid to be supplied to a print head configured to eject the liquid;*

*a supply path for supplying the liquid in the first tank to the print head;*

*a valve unit including a valve portion configured to open and close the supply path, the valve portion having an open state, in which the supply path is open, and a closed state, in which the supply path is closed, and a valve lever handle configured to be operable for a user to open and close the valve portion;*

*a cover member arranged so as to be able to open and close with respect to the printing apparatus, the valve lever handle being covered by the cover member when*

*the cover member is closed, and the valve lever handle being uncovered by the cover member when the cover member is opened;*

*a conveying unit configured to convey a print medium in a first direction; and*

*a central processing unit,*

*wherein the first tank and the second tank are provided along a second direction intersecting the first direction,*

*wherein, after the valve lever handle causes the valve portion to be in the closed state and the cover member covers the valve lever handle, the closed state is maintained, and*

*wherein, in a case where a transportation mode for transporting the printing apparatus is selected by a user, the central processing unit is programmed to execute:*

*(1) displaying a message prompting the user to close the valve portion on a display provided with the printing apparatus;*

*(2) confirming whether or not the valve portion is in the closed state after the displaying; and*

*(3) shutdown processing to power off the printing apparatus after confirmation that the valve portion is in the closed state.*

*22. The printing apparatus according to claim 21, wherein the valve portion is within a width of the print medium conveyed by the conveying unit.*

*23. The printing apparatus according to claim 21, wherein the valve lever handle is within a width of the print medium conveyed by the conveying unit.*

*24. The printing apparatus according to claim 21, wherein, in a case where the valve portion is in the closed state before preparation of printing, the central processing unit executes notifying the user to operate the valve lever handle.*

*25. The printing apparatus according to claim 21, further comprising:*

*a carriage configured to carry the print head and move in the second direction.*

*26. The printing apparatus according to claim 25, wherein the valve lever handle is operable for a user to open and close the valve portion in a state where the carriage is in a predetermined position in the second direction.*

*27. The printing apparatus according to claim 21, further comprising:*

*a first detection unit configured to detect whether the cover member is open.*

*28. The printing apparatus according to claim 21, further comprising:*

*a second detection unit configured to detect whether the valve portion is in the closed state.*

*29. The printing apparatus according to claim 21, wherein the supply path is formed by a tube.*

*30. The printing apparatus according to claim 21, further comprising:*

*a second supply path for supplying the liquid in the second tank to the print head,*

*wherein the second supply path is closed in a state where the valve portion is in the closed state.*

*31. The printing apparatus according to claim 21, wherein the first tank and the second tank are arranged adjacent to each other.*

*32. The printing apparatus according to claim 21, wherein the first tank stores black ink and the second tank stores color ink.*

*33. The printing apparatus of claim 21, wherein the first tank includes an injection portion to which the liquid is injected.*

*34. The printing apparatus according to claim 33, wherein the injection portion is detachably capped by a tank cap.*

*35. The printing apparatus according to claim 21, wherein the valve portion is a member different from the valve lever handle.*

*36. The printing apparatus according to claim 21, further comprising the print head.*

*37. A printing apparatus comprising:*

*a tank configured to store liquid to be supplied to a print head configured to eject the liquid;*

*a supply path for supplying the liquid in the tank to the print head;*

*a valve unit including a valve portion configured to open and close the supply path, the valve portion having an open state, in which the supply path is open, and a closed state, in which the supply path is closed, and a valve lever handle configured to be operatable for a user to open and close the valve portion;*

*a central processing unit; and*

*a cover member arranged so as to be able to open and close with respect to the printing apparatus, the valve lever handle being covered by the cover member when the cover member is closed, and the valve lever handle being uncovered by the cover member when the cover member is opened,*

*wherein, in a state where the cover member uncovers the valve lever handle, the valve lever handle is operable from above the printing apparatus,*

*wherein, after the valve lever handle causes the valve portion to be in the closed state and the cover member covers the valve lever handle, the closed state is maintained, and*

*wherein, in a case where a transportation mode for transporting the printing apparatus is selected by a user, the central processing unit is programmed to execute:*

*(1) displaying a message prompting the user to close the valve portion on a display provided with the printing apparatus;*

*(2) confirming whether or not the valve portion is in the closed state after the displaying; and*

*(3) shutdown processing to power off the printing apparatus after confirmation that the valve portion is in the closed state.*

*38. The printing apparatus according to claim 37, further comprising:*

*a conveying unit configured to convey a print medium to the print head,*

*wherein the valve portion is within a width of the print medium conveyed by the conveying unit.*

*39. The printing apparatus according to claim 37, further comprising:*

*a conveying unit configured to convey a print medium to the print head,*

*wherein the valve lever handle is within a width of the print medium conveyed by the conveying unit.*

*40. The printing apparatus according to claim 39, wherein, in a case where the valve portion is in the closed state before preparation of printing, the display panel notifies the user to operate the valve lever handle.*

*41. The printing apparatus according to claim 37, further comprising:*

*a carriage configured to carry the print head and move in a first direction.*

*42. The printing apparatus according to claim 41, wherein the valve lever handle is operable for a user to open and close the valve portion in a state where the carriage is in a predetermined position in the first direction.*

*43. The printing apparatus according to claim 37, further comprising:*

*a first detection unit configured to detect whether the cover member is open.*

*44. The printing apparatus according to claim 37, further comprising:*

*a second detection unit configured to detect whether the valve portion is in the closed state.*

*45. The printing apparatus according to claim 37, wherein the supply path is formed by a tube.*

*46. The printing apparatus according to claim 37, further comprising:*

*a second tank configured to store liquid to be supplied to the print head; and*

*a second supply path for supplying the liquid in the second tank to the print head,*

*wherein the second supply path is closed in a state where the valve portion is in the closed state.*

*47. The printing apparatus according to claim 46, wherein the tank and the second tank are arranged adjacent to each other.*

*48. The printing apparatus according to claim 46, wherein the tank stores black ink and the second tank stores color ink.*

*49. The printing apparatus according to claim 37, wherein the tank includes an injection portion to which the liquid is injected.*

*50. The printing apparatus according to claim 49, wherein the injection portion is detachably capped by a tank cap.*

*51. The printing apparatus according to claim 37, wherein the valve portion is a member different from the valve lever handle.*

*52. The printing apparatus according to claim 37, further comprising the print head.*

*53. A printing apparatus comprising:*

*a tank including a liquid storage chamber configured to store liquid to be supplied to a print head configured to eject the liquid and an injection portion configured to allow the liquid to be injected into the liquid storage chamber;*

*a supply path for supplying the liquid stored in the liquid storage chamber to the print head;*

*a valve unit configured to open and close the supply path, the valve unit having an open state, in which the supply path is open, and a closed state, in which the supply path is closed;*

*a valve lever handle configured to be operatable for a user to switch the valve unit between the open state and the closed state;*

*a central processing unit; and*

*a cover member arranged so as to be able to open and close with respect to the printing apparatus, the injection portion being covered by the cover member when the cover member is closed, and the injection portion being uncovered by the cover member when the cover member is opened,*

*wherein the closed state is maintained in a case where the valve lever handle causes the valve unit to be in the closed state after the cover member covers the injection portion, and*

*wherein, in a case where a transportation mode for transporting the printing apparatus is selected by a user, the central processing unit is programmed to execute:*

*(1) displaying a message prompting the user to close the valve unit on a display provided with the printing apparatus;*

*(2) confirming whether or not the valve unit is in the closed state after the displaying; and*

*(3) shutdown processing power off the printing apparatus after the confirmation that the valve unit is in the closed state.*

*54. The printing apparatus according to claim 53, wherein the injection portion is detachably capped by the tank cap.*

*55. The printing apparatus according to claim 53, further comprising:*

*a conveying unit configured to convey a print medium to the print head,*

*wherein the valve lever handle is within a width of the print medium conveyed by the conveying unit.*

*56. The printing apparatus according to claim 53, wherein, in a case where the first valve portion is in the closed state before preparation of printing, the central processing unit executes notifying the user to operate the valve lever handle.*

*57. The printing apparatus according to claim 53, wherein the supply path is formed by a tube.*

*58. The printing apparatus according to claim 53, further comprising the print head.*

*59. The printing apparatus according to claim 1, wherein the valve lever handle is arranged in a region through which the print medium conveyed by the conveying unit passes.*

*60. The printing apparatus according to claim 14, wherein the valve lever handle is arranged in a region through which the print medium conveyed by the conveying unit passes.*

* * * * *